United States Patent
Guo et al.

(10) Patent No.: US 11,915,387 B2
(45) Date of Patent: Feb. 27, 2024

(54) CROP YIELD PREDICTION AT FIELD-LEVEL AND PIXEL-LEVEL

(71) Applicant: Mineral Earth Sciences LLC, Mountain View, CA (US)

(72) Inventors: Cheng-en Guo, Santa Clara, CA (US); Wilson Zhao, Fremont, CA (US); Jie Yang, Sunnyvale, CA (US); Zhiqiang Yuan, San Jose, CA (US)

(73) Assignee: MINERAL EARTH SCIENCES LLC, Mountain View, CA (US)

( * ) Notice: Subject to any disclaimer, the term of this patent is extended or adjusted under 35 U.S.C. 154(b) by 0 days.

(21) Appl. No.: 18/138,003

(22) Filed: Apr. 21, 2023

(65) Prior Publication Data

US 2023/0274391 A1 Aug. 31, 2023

Related U.S. Application Data

(63) Continuation of application No. 16/224,652, filed on Dec. 18, 2018, now Pat. No. 11,676,244.

(Continued)

(51) Int. Cl.
*G06T 3/40* (2006.01)
*G06T 7/00* (2017.01)
(Continued)

(52) U.S. Cl.
CPC .......... *G06T 3/4007* (2013.01); *A01D 41/127* (2013.01); *G06N 3/047* (2023.01);
(Continued)

(58) Field of Classification Search
CPC ........ G06T 3/4007; G06T 7/143; G06T 5/50; G06T 7/0016; G06T 2207/10016;
(Continued)

(56) References Cited

U.S. PATENT DOCUMENTS 5,897,619 A    4/1999    Hargrove et al.
8,437,498 B2   5/2013    Malsam
(Continued)

FOREIGN PATENT DOCUMENTS

CN    107945146    4/2018
JP    2003006612   1/2003

OTHER PUBLICATIONS

Canadian Patent Office; Examiners Report issued in Application No. 3,117,082, 3 pages, dated May 5, 2022.
(Continued)

*Primary Examiner* — Michael R Neff
(74) *Attorney, Agent, or Firm* — Gray Ice Higdon

(57) ABSTRACT

Implementations relate to crop yield prediction at the field- and pixel-level. In various implementations, a first temporal sequence of high-elevation digital images may be obtained that capture a first geographic area and are acquired over a first predetermined time interval while the first geographic area includes a particular crop. A first plurality of other data points may also be obtained that influence a ground truth crop yield of the first geographic area after the first predetermined time interval. The first plurality of other data points may be grouped into temporal chunks corresponding temporally with respective images of the first temporal sequence. The first temporal sequence and the temporal chunks of the first plurality of other data points may be applied, e.g., iteratively, as input across a machine learning model to estimate a crop yield of the first geographic area at the end of the first predetermined time interval.

20 Claims, 15 Drawing Sheets

Related U.S. Application Data

(60) Provisional application No. 62/748,296, filed on Oct. 19, 2018.

(51) Int. Cl.

| | | |
|---|---|---|
| *A01D 41/127* | (2006.01) | |
| *G06T 5/50* | (2006.01) | |
| *G06T 7/143* | (2017.01) | |
| *G06N 3/08* | (2023.01) | |
| *G06Q 10/04* | (2023.01) | |
| *G06Q 50/02* | (2012.01) | |
| *G06V 20/10* | (2022.01) | |
| *G06N 3/047* | (2023.01) | |
| *G06V 10/82* | (2022.01) | |
| *G06V 20/13* | (2022.01) | |

(52) U.S. Cl.
CPC ............... *G06N 3/08* (2013.01); *G06Q 10/04* (2013.01); *G06Q 50/02* (2013.01); *G06T 5/50* (2013.01); *G06T 7/0016* (2013.01); *G06T 7/143* (2017.01); *G06V 10/82* (2022.01); *G06V 20/13* (2022.01); *G06V 20/188* (2022.01); *G06T 2207/10016* (2013.01); *G06T 2207/10032* (2013.01); *G06T 2207/10048* (2013.01); *G06T 2207/20081* (2013.01); *G06T 2207/20084* (2013.01); *G06T 2207/20221* (2013.01); *G06T 2207/30181* (2013.01); *G06T 2207/30188* (2013.01); *G06V 20/194* (2022.01)

(58) Field of Classification Search
CPC . G06T 2207/10032; G06T 2207/10048; G06T 2207/20081; G06T 2207/20084; G06T 2207/20221; G06T 2207/30181; G06T 2207/30188; G06V 10/82; G06V 20/188; G06V 20/13; G06V 20/194; G06N 3/047; G06N 3/08; A01D 41/127; G06Q 10/04; G06Q 50/02
USPC .......................................................... 706/21
See application file for complete search history.

(56) References Cited

U.S. PATENT DOCUMENTS

| | | | |
|---|---|---|---|
| 9,665,927 | B2 | 5/2017 | Ji et al. |
| 9,965,845 | B2 | 5/2018 | Jens et al. |
| 10,891,735 | B2 | 1/2021 | Yang et al. |
| 2005/0192760 | A1 | 9/2005 | Dunlap |
| 2009/0232349 | A1 | 9/2009 | Moses et al. |
| 2013/0282423 | A1 | 10/2013 | Hori et al. |
| 2014/0067745 | A1 | 3/2014 | Avey et al. |
| 2015/0040473 | A1 | 2/2015 | Lankford |
| 2016/0093212 | A1 | 3/2016 | Barfield, Jr. et al. |
| 2016/0125331 | A1 | 5/2016 | Vollmar et al. |
| 2016/0202227 | A1 | 7/2016 | Mathur et al. |
| 2016/0223506 | A1 | 8/2016 | Shriver et al. |
| 2016/0224703 | A1 | 8/2016 | Shriver |
| 2016/0334276 | A1 | 11/2016 | Pluvinage |
| 2017/0016870 | A1 | 1/2017 | McPeek |
| 2017/0090068 | A1 | 3/2017 | Xiang et al. |
| 2017/0235996 | A1 | 8/2017 | Kwan |
| 2017/0251589 | A1 | 9/2017 | Tippery et al. |
| 2018/0025480 | A1 | 1/2018 | Dingle et al. |
| 2018/0035605 | A1 | 2/2018 | Guan et al. |
| 2018/0137357 | A1 | 5/2018 | Margalit et al. |
| 2018/0146626 | A1 | 5/2018 | Xu |
| 2018/0182068 | A1 | 6/2018 | Kwan |
| 2018/0189564 | A1 | 7/2018 | Freitag et al. |
| 2018/0211156 | A1 | 7/2018 | Guan et al. |
| 2018/0218197 | A1 | 8/2018 | Kwan |
| 2018/0253600 | A1 | 9/2018 | Ganssle |
| 2018/0293671 | A1 | 10/2018 | Murr et al. |
| 2018/0308229 | A1 | 10/2018 | Winkler et al. |
| 2018/0330435 | A1 | 11/2018 | Garg |
| 2019/0392596 | A1 | 12/2019 | Yang et al. |
| 2020/0074605 | A1* | 3/2020 | Goyal ..................... G06T 5/005 |
| 2020/0125929 | A1 | 4/2020 | Guo et al. |
| 2020/0126232 | A1 | 4/2020 | Guo et al. |
| 2021/0118097 | A1 | 4/2021 | Guan et al. |
| 2021/0150717 | A1 | 5/2021 | Guo et al. |
| 2021/0256702 | A1 | 8/2021 | Yang et al. |

OTHER PUBLICATIONS

Canadian Patent Office; Examiner's Report issued in Application No. 3,117,084, 4 pages, dated May 10, 2022.

Lee, W.S.; Citrus Yield Mapping System in Natural Outdoor Scenes using the Watershed Transform; dated Jul. 2006.

Calafell, Davinia; Application of image processing methodologies for fruit detection and analysis; Universitat de Lleida; 86 pages; dated Jul. 2014.

Climate Fieldview—Yield Analysis; Video retrieved from https://www.youtube.com/watch?v=G6M-YGolxeA; dated Nov. 1, 2017.

Google Glass—New Tool for Ag; Video retrieved from https://www.youtube.com/watch?v=drypBC4bzLg; dated Oct. 31, 2014.

Grassi, Mathew; Google Glass: New Tool For Ag; retrieved from https://www.croplife.com/precision/google-glass-new-tool-or-toy-for-ag/; dated Oct. 8, 2014.

European Patent Office; International Search Report and Written Opinion issued in PCT application Ser. No. PCT/US2019/056882; 19 pages; dated Apr. 16, 2020.

European Patent Office; Invitation to Pay Additional Fees issued in Ser. No. PCT/US2019/056882; 19 pages; dated Jan. 29, 2020.

Thanaphong Phongpreecha (Joe), "Early Corn Yields Prediction Using Satellite Images;" retrieved from internet: https://tpjoe.gitlab.io/post/cropprediction/; 13 pages; Jul. 31, 2018.

Rao, J. et al., "Spatiotemporal Data Fusion Using Temporal High-Pass Modulation and Edge Primitives;" IEEE Transactions on Geoscience and Remote Sensing, vol. 53, No. 11; pp. 5853-5860; Nov. 1, 2015.

Zhang, L. et al., "An evaluation of monthly impervious surface dynamics by fusing Landsat and MODIS time series in the Pearl River Delta, China, from 2000 to 2015;" Remote Sensing of Environment, vol. 201, pp. 99-114, Nov. 1, 2017.

Li, L. et al. (2017). Super-resolution reconstruction of high-resolution satellite ZY-3 TLC images. Sensors, 17(5), 1062; 12 pages.

Sabini, M. et al. (2017). Understanding Satellite-Imagery-Based Crop Yield Predictions. Technical Report. Stanford University. http://cs231n.stanford.edu/reports/2017/pdfs/555.pdf [AccessedonOct. 23, 2017]; 9 pages.

Huang, T. et al. (2010). Image super-resolution: Historical overview and future challenges. In Super-resolution imaging, CRC Press; pp. 19-52.

Smith, J. (Jul. 19, 2018). Using new satellite imagery sources and machine learning to predict crop types in challenging geographies; Building tools to help small-scale farmers connect to the global economy. https://medium.com/devseed/using-new-satellite-imagery-sources-and-machine-learning-to-predict-crop-types-in-challenging-4eb4c4437ffe. [retrieved Oct. 3, 2018]; 6 pages.

Gao, F. et al. (2006). On the blending of the Landsat and MODIS surface reflectance: Predicting daily Landsat surface reflectance. IEEE Transactions on Geoscience and Remote sensing, 44(8); pp. 2207-2218.

Zabala, S. (2017). Comparison of multi-temporal and multispectral Sentinel-2 and Unmanned Aerial Vehicle imagery for crop type mapping. Master of Science (MSc) Thesis, Lund University, Lund, Sweden; 73 pages.

Emelyanova, I. et al. (2012). On blending Landsat-MODIS surface reflectances in two landscapes with contrasting spectral, spatial and temporal dynamics; 83 pages.

Sublime, J. et al. (2017). Multi-scale analysis of very high resolution satellite images using unsupervised techniques. Remote Sensing, 9(5), 495; 20 pages.

(56) References Cited

OTHER PUBLICATIONS

Rao, V. et al. (2013). Robust high resolution image from the low resolution satellite image. In Proc. of Int. Conf. on Advances in Computer Science (AETACS); 8 pages.

Yang, C. et al. (2012). Using high-resolution airborne and satellite imagery to assess crop growth and yield variability for precision agriculture. Proceedings of the IEEE, 101(3), 582-592.

Barazzetti, L. et al. (2014). Automatic registration of multi-source medium resolution satellite data. International Archives of the Photogrammetry, Remote Sensing & Spatial Information Sciences; pp. 23-28.

Barazzetti, L. et al. (2014). Automatic co-registration of satellite time series via least squares adjustment. European Journal of Remote Sensing, 47(1); pp. 55-74.

Johnson, J. et al. (2016). Perceptual losses for real-time style transfer and super-resolution. Department of Computer Science, Stanford University; 18 pages.

Cheng, Q. et al. (2014). Cloud removal for remotely sensed images by similar pixel replacement guided with a spatio-temporal MRF model. ISPRS journal of photogrammetry and remote sensing, 92; pp. 54-68.

Lin, C. H. et al. (2012). Cloud removal from multitemporal satellite images using information cloning. IEEE transactions on geoscience and remote sensing, 51(1), 232-241.

Tseng, D. C. et al. (2008). Automatic cloud removal from multi-temporal SPOT images. Applied Mathematics and Computation, 205(2); pp. 584-600.

Luo, Y. et al. (2018). STAIR: A generic and fully-automated method to fuse multiple sources of optical satellite data to generate a high-resolution, daily and cloud-/gap-free surface reflectance product. Remote Sensing of Environment, 214; pp. 87-99.

Hengl, T. et al. (2017) SoilGrids250m: Global gridded soil information based on machine learning. PLoS ONE 12(2): e0169748. doi:10.1371/journal. pone.0169748; 40 pages.

Mohanty, S. et al. (2016) Using Deep Learning for Image-Based Plant Disease Detection. Front. Plant Sci. 7:1419. doi: 10.3389/fpls.2016.01419; 10 pages.

Pantazi, X. et al. (2016). Wheat yield prediction using machine learning and advanced sensing techniques. Computers and Electronics in Agriculture, 121; pp. 57-65.

European Patent Office; International Search Report and Written Opinion of Ser. No. PCT/US2019/056883; 15 pages; dated Dec. 20, 2019.

Klompenburg, Thomas et al.; Crop yield prediction using machine learning: A systematic literature review; Computers and Electronics in Agriculture; 18 pages; dated 2020.

Malleswara Rao J et al; Spatiotemporal Data Fusion Using Temporal High-Pass Modulation and Edge Primitives, IEEE Transactions on Geoscience and Remote Sensing, IEEE Service Center, Piscataway, NJ, US, vol. 53, No. 11, pp. 5853-5860, dated Nov. 1, 2015.

Zhang Lei et al: "An evaluation of monthly impervious surface dynamics by fusing Landsat and MODIS time series in the Pearl River Delta, China, from 2000 to 2015", Remote Sensing of Environment, vol. 201, pp. 99-114, dated Sep. 14, 2017.

Canadian Patent Office; Examiner's Report issued in Application No. 3,117,084, 4 pages, dated Jan. 11, 2023.

Canadian Patent Office; Examiners Report issued in Application No. 3,117,082, 3 pages, dated Jan. 9, 2023.

European Patent Office; Intention to Grant issued for Application No. 19801140.5, 9 pages, dated Jul. 6, 2023.

European Patent Office; Communication pursuant to Article 94(3) EPC issued in Application No. 19801140.5-1207; 4 pages; dated May 4, 2023.

European Patent Office; Result of Consultation issued in EP Application No. 19 801 140.5-1207; 5 pages; dated Apr. 26, 2023.

European Patent Office; Intention to Grant issued in Application No. 19801445.8; 58 pages; dated Apr. 26, 2023.

Canada Patent Office; Examination Report issued in Application No. 3117082; 5 pages; dated Nov. 3, 2023.

* cited by examiner

CROP YIELD PREDICTION AT FIELD-LEVEL AND PIXEL-LEVEL

BACKGROUND

Crop yields may be influenced by myriad factors, both naturally-occurring and induced by humans. Naturally-occurring factors include, but are not limited to, climate-related factors such as temperature, precipitation, humidity, as well as other naturally-occurring factors such as disease, animals and insects, soil composition and/or quality, and availability of sunlight, to name a few. Human-induced or "operational" factors are myriad, and include application of pesticides, application of fertilizers, crop rotation, applied irrigation, soil management, crop choice, and disease management, to name a few.

One source of operational data is farm machinery, which are becoming increasingly sophisticated. For example, some tractors are configured to automatically log various data pertaining to their operation, such as where they were operated (e.g., using position coordinate data), how frequently they were operated in various areas, the kinds of operations they perform in various areas at various times, and so forth. In some cases, tractor-generated data may be uploaded by one or more tractors (e.g., in real time or during downtime) to a central repository of tractor-generated data. Agricultural personnel such as farmers or entities that analyze crop yields and patterns may utilize this data for various purposes.

In addition to factors that influence crop yields, detailed observational data is becoming increasingly available in the agriculture domain. Myriad data related to soil quality, aeration, etc., may be gathered from one or more sensors deployed throughout a geographic area such as a field. As another example, digital images captured from high elevations, such as satellite images, images captured by unmanned aerial vehicles, manned aircraft, or images captured by high elevation manned aircraft (e.g., space shuttles), are becoming increasingly important for agricultural applications, such as estimating a current state or health of a field. However, high-elevation digital imagery presents various challenges, such as the fact that 30-60% of such images tend to be covered by clouds, shadows, haze and/or snow.

Moreover, the usefulness of these high-elevation digital images is limited by factors such as observation resolutions and/or the frequency at which they are acquired. For example, it has proven feasible to deploy multiple different airborne observation vehicles that capture digital images of the same geographic areas at different temporal, spatial, and/or spectral frequencies. For example, the moderate resolution imaging spectroradiometer ("MODIS") satellite deployed by the National Aeronautics and Space Administration ("NASA") captures high-elevation digital images at a relatively high temporal frequency (e.g., a given geographic area may be captured daily, or multiple times per week), but at relatively low spatial/spectral resolutions. By contrast, the Sentinel-2 satellite deployed by the European Space Agency ("ESA") captures high-elevation digital images at a relatively low temporal frequency (e.g., a given geographic area may only be captured once every few days or even weeks), but at relatively high spatial/spectral resolutions. High-elevation digital images generated by sources such as the MODIS and Sentinel-2 satellites may be aligned to the same geographic area based on global position system ("GPS") coordinates or other position coordinates associated with (e.g., added as annotations to) the high-elevation digital images.

SUMMARY

The present disclosure is generally directed to methods, apparatus, and computer-readable media (transitory and non-transitory) for to mining these various sources of crop-influencing (operational or naturally-occurring) and observational crop data for use with artificial intelligence to predict crop yields, both for geographic areas such as fields (or regions containing multiple fields) and individual geographic units that underlie pixels of high-elevation digital imagery. In various implementations, one or more memory-based neural networks, such as a recurrent neural network, a long short-term memory ("LSTM") neural network, a gated recurrent unit ("GRU") neural network, etc., may be trained to generate output that is indicative, for instance, of predicted crop yield. Inputs to such a model may include various combinations of the crop-influencing and observational data points described previously. In particular, using a combination of observational data and crop-influencing data (naturally occurring and/or human-induced) as inputs, a recurrent neural network can be trained to predict an estimated or predicted crop yield in a given geographic area, including within individual geographic units within the geographic area (e.g., ten-by-ten meter areas corresponding to pixels of high-elevation digital images, or even three-by-three meter areas corresponding to even higher resolution pixels of high-elevation digital images).

In various implementations, input applied across a memory-based neural network, whether for training or inference, may include a temporal sequence of inputs acquired over at least a portion of a predetermined time interval, such as a year, a "crop year" or "crop cycle," etc. Each input of the temporal sequence may include, as observational data, a high-elevation digital image of a geographic area under consideration. Each input of the temporal sequence may also include various other crop-influencing data points mentioned previously that pertain to the geographic area under consideration. The temporal sequence of inputs may be iteratively applied as input across the memory-based neural network to generate output indicative of an estimated crop yield of the geographic area at the end of the predetermined time interval.

If the memory-based neural network is being trained, then the output of the model, which may represent estimated crop yield of the geographic area, may be compared to a ground truth crop yield to determine an error. This error may then be used to train the memory-based neural network, e.g., using techniques such as gradient descent, back propagation, etc. If the memory-based neural network is already trained, and is being used to predict a crop yield for the geographic area, the predicted crop yield may be output audibly or visually to one or more interested parties, e.g., as part of a report.

As noted previously, high-elevation digital imagery presents various challenges. At least some ground truth high-elevation digital images may be partially or wholly obscured by transient obstructions, such as clouds, snow, etc. Additionally, it is often the case that high-elevation digital images having a spatial resolution sufficient for meaningful observation are acquired of the geographic area at relatively low temporal frequencies (e.g., once every ten days, once a quarter, etc.). Accordingly, in various implementations, digital images from multiple temporal sequences of digital images acquired at disparate resolutions/frequencies may be fused using techniques described herein to generate "synthetic" high-elevation digital images of the geographic area that are free of transient obstructions and/or have sufficient spatial resolutions for meaningful observation. These synthetic high-elevation digital images may then be applied as input across the aforementioned memory-based neural networks, in conjunction with the plurality of other data points mentioned previously, to facilitate enhanced crop yield prediction.

A memory-based neural network trained using techniques described herein may be used to predict (infer) crop yields for geographic areas at any point during a pertinent time interval, such as days, weeks, or even months before harvest. The accuracy of the prediction may depend on a variety of factors, such as the availability of observational and crop-influencing data, and the temporal proximity to the end of the pertinent time interval (i.e., the closer to harvest, the more accurate the prediction is likely to be).

In some implementations, a memory-based neural network trained using techniques described herein may be used to predict (infer) crop yields for geographic areas for which at least some input data is not available. For example, a temporal sequence of high-elevation digital images (ground truth or synthetically generated as described previously) may be available for a given field, but other data specific to that field, such as operational data, may not be available, or may not be available at a sufficient level of detail. In some implementations, the missing or incomplete data may be extrapolated from other data sources. For example, if the field resides in a particular geographic region, weather and/or soil quality statistics applicable across the entire region (or in another region deemed sufficiently similar) may be substituted as observational inputs for the memory-based neural network. In some implementations, "best practice" data, or at least "average practice" data, may be substituted for missing or incomplete operational data such as applied pesticides, fertilizers, irrigation, etc. In other words, data concerning human-induced and/or naturally-occurring factors may be assumed.

In some implementations, a computer implemented method may be provided that includes: obtaining a first temporal sequence of high-elevation digital images, wherein the first temporal sequence of high-elevation digital images capture a first geographic area and are acquired over a first predetermined time interval, and wherein during the first predetermined time interval, the first geographic area includes a first type of crop; obtaining a first plurality of other data points, wherein the first plurality of other data points influence a ground truth crop yield of the first geographic area after the first predetermined time interval, and wherein the first plurality of other data points are grouped into temporal chunks, each temporal chunk of the first plurality of other data points corresponding temporally with a respective high-elevation digital image of the first temporal sequence of high-elevation digital images; iteratively applying the high-elevation digital images of the first temporal sequence and the temporal chunks of the first plurality of other data points as input across a machine learning model to generate first output indicative of an estimated crop yield of the first geographic area at the end of the first predetermined time interval; and causing one or more output components of one or more computing devices to audibly or visually convey the estimated crop yield of the first geographic area at the end of the first predetermined time interval.

This method and other implementations of technology disclosed herein may each optionally include one or more of the following features.

In various implementations, the machine learning model may be a recurrent neural network, such as a long short-term memory ("LSTM") or gated recurrent unit ("GRU") neural network.

In various implementations, the machine learning model may be trained by performing operations such as the following: obtaining a second temporal sequence of high-elevation digital images, wherein the second temporal sequence of high-elevation digital images capture the first geographic area or a second geographic area and are acquired over a second predetermined time interval, and wherein during the second predetermined time interval, the first geographic area or the second geographic area includes the first type of crop; obtaining a second plurality of other data points, wherein the second plurality of other data points influence a ground truth crop yield of the first geographic area or the second geographic area at the end of the second predetermined time interval, and wherein the second plurality of other data points are grouped into temporal chunks, each temporal chunk of the second plurality of other data points corresponding temporally with a respective high-elevation digital image of the second temporal sequence of high-elevation digital images; iteratively applying the high-elevation digital images of the second temporal sequence and the temporal chunks of the second plurality of other data points as input across the machine learning model to generate second output indicative of an estimated crop yield of first geographic area or the second geographic area at the end of the second predetermined time interval; comparing the estimated crop yield of the first geographic area or second geographic area at the end of the second predetermined time interval to the ground truth crop yield of the first geographic area or the second geographic area at the end of the second predetermined time interval; and training the machine learning model based on the comparing.

In various implementations, obtaining the first temporal sequence of high-elevation digital images may include: obtaining a second temporal sequence of high-elevation digital images, wherein the second temporal sequence of high-elevation digital images capture the first geographic area at a first temporal frequency, and wherein each high-elevation digital image of the second temporal sequence is captured at a first spatial resolution; obtaining a third temporal sequence of high-elevation digital images, wherein the third temporal sequence of high-elevation digital images capture the first geographic area at a second temporal frequency that is less than the first temporal frequency, and wherein each high-elevation digital image of the third temporal sequence is captured at a second spatial resolution that is greater than the first spatial resolution; selecting a given high-elevation digital images from the second temporal sequence that is captured during a time interval in which no high-elevation digital images of the third temporal sequence are available; and fusing the given high-elevation digital image of the second temporal sequence with data from one or more high-elevation digital images of the third temporal sequence to generate a synthetic high-elevation digital image of the first geographic area at the second spatial resolution; wherein the synthetic high-elevation digital image of the first geographic area is included as part of the first temporal sequence of high-elevation digital images.

In various implementations, the first plurality of other data points may include one or more data points that are extrapolated from a geographic region that includes the first geographic area. In various implementations, the first plurality of other data points may include one or more data points that are extrapolated from another geographic area that is used to grow the first type of crop. In various implementations, the first plurality of other data points may include one or more data points that are inferred using expectation maximization.

In various implementations, the first plurality of other data points may include one or more of: irrigation applied to at least a portion of the first geographic area; precipitation of at least a portion of the first geographic area; fertilizer applied to at least a portion of the first geographic area; pesticide applied to at least a portion of the first geographic area; or one or more soil measures of one or more portions of the first geographic area. Additionally or alternatively, in some implementations, the first plurality of other data points may include operational data generated by farm machinery used to manage the first geographic area. In some such implementations, the farm machinery may include at least one autonomous tractor.

Other implementations may include a non-transitory computer readable storage medium storing instructions executable by a processor to perform a method such as one or more of the methods described above. Yet another implementation may include a system including memory and one or more processors operable to execute instructions, stored in the memory, to implement one or more modules or engines that, alone or collectively, perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
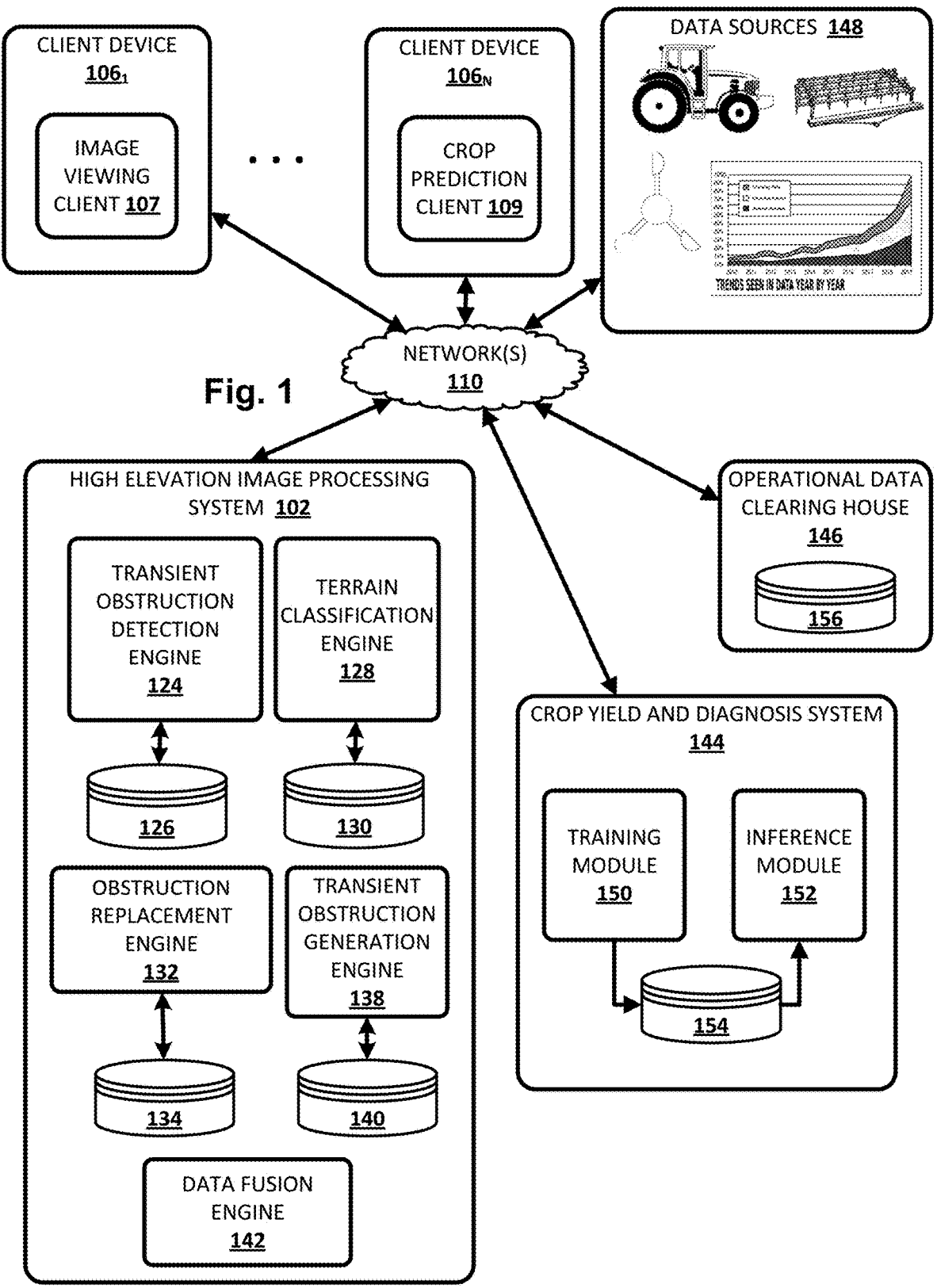
FIG. 1 illustrates an example environment in selected aspects of the present disclosure may be implemented, in accordance with various implementations.

FIG. 1 illustrates an environment in which one or more selected aspects of the present disclosure may be implemented, in accordance with various implementations. The example environment includes a plurality of client devices $106_{1-N}$, a high elevation digital image processing system 102, a crop yield and diagnosis system 144 (which may alternatively be referred to as a "crop yield modeling and diagnosis system"), an operational data clearing house 146, and one or more data sources 148. Each of components $106_{1-N}$, 102, 144, and 146 may be implemented in one or more computers that communicate, for example, through a network. High elevation digital image processing system 102 and crop yield and diagnosis system 144 are examples of information retrieval systems in which the systems, components, and techniques described herein may be implemented and/or with which systems, components, and techniques described herein may interface.

An individual (which in the current context may also be referred to as a "user") may operate a client device 106 to interact with other components depicted in FIG. 1. Each component depicted in FIG. 1 may be coupled with other components through one or more networks 110, such as a local area network (LAN) or wide area network (WAN) such as the Internet. Each client device 106 may be, for example, a desktop computing device, a laptop computing device, a tablet computing device, a mobile phone computing device, a computing device of a vehicle of the participant (e.g., an in-vehicle communications system, an in-vehicle entertainment system, an in-vehicle navigation system), a standalone interactive speaker (with or without a display), or a wearable apparatus of the participant that includes a computing device (e.g., a watch of the participant having a computing device, glasses of the participant having a computing device). Additional and/or alternative client devices may be provided.

Each of client device 106, high elevation digital image processing system 102, crop yield and diagnosis system 144, and operational data clearing house 146 may include one or more memories for storage of data and software applications, one or more processors for accessing data and executing applications, and other components that facilitate communication over a network. The operations performed by client device 106, high elevation digital image processing system 102, crop yield and diagnosis system 144, and/or operational data clearing house 146 may be distributed across multiple computer systems. Each of high elevation digital image processing system 102, crop yield and diagnosis system 144, and operational data clearing house 146 may be implemented as, for example, computer programs running on one or more computers in one or more locations that are coupled to each other through a network.

Each client device 106 may operate a variety of different applications that may be used, for instance, to view high-elevation digital images that are processed using techniques described herein to remove transient obstructions such as clouds, shadows (e.g., cast by clouds), snow, manmade items (e.g., tarps draped over crops), etc. For example, a first client device 106$_1$ operates an image viewing client 107 (e.g., which may be standalone or part of another application, such as part of a web browser). Another client device 106$_N$ may operate a crop prediction application 109 that allows a user to initiate and/or study agricultural predictions and/or recommendations provided by, for example, crop yield and diagnosis system 144.

In various implementations, high elevation digital image processing system 102 may include a transient obstruction detection engine 124, a terrain classification engine 128, an obstruction replacement engine 132, a transient obstruction generation engine 138, and/or a data fusion engine 142. In some implementations one or more of engines 124, 128, 132, 138, and/or 142 may be omitted. In some implementations all or aspects of one or more of engines 124, 128, 132, 138, and/or 142 may be combined. In some implementations, one or more of engines 124, 128, 132, 138, and/or 142 may be implemented in a component that is separate from high elevation digital image processing system 102. In some implementations, one or more of engines 124, 128, 132, 138, and/or 142, or any operative portion thereof, may be implemented in a component that is executed by client device 106.

Transient obstruction detection engine 124 may be configured to detect, in high-elevation digital images, transient obstructions such as clouds, shadows cast by clouds, rain, haze, snow, flooding, and/or manmade obstructions such as tarps, etc. Transient obstruction detection engine 124 may employ a variety of different techniques to detect transient obstructions. For example, to detect clouds (e.g., create a cloud mask), transient obstruction detection engine 124 may use spectral and/or spatial techniques. In some implementations, one or more machine learning models may be trained and stored, e.g., in index 126, and used to identify transient obstructions. For example, in some implementations, one or more deep convolutional neural networks known as "U-nets" may be employed. U-nets are trained to segment images in various ways, and in the context of the present disclosure may be used to segment high elevation digital images into segments that include transient obstructions such as clouds. Additionally or alternatively, in various implementations, other known spectral and/or spatial cloud detection techniques may be employed, including techniques that either use, or don't use, thermal infrared spectral bands.

In some implementations, terrain classification engine 128 may be configured to classify individual pixels, or individual geographic units that correspond spatially with the individual pixels, into one or more "terrain classifications." Terrain classifications may be used to label pixels by what they depict. Non-limiting examples of terrain classifications include but are not limited to "buildings," "roads," "water," "forest," "crops," "vegetation," "sand," "ice," "mountain," "tilled soil," and so forth. Terrain classifications may be as coarse or granular as desired for a particular application. For example, for agricultural monitoring it may be desirable to have numerous different terrain classifications for different types of crops. For city planning it may be desirable to have numerous different terrain classifications for different types of buildings, roofs, streets, parking lots, parks, etc.

Terrain classification engine 128 may employ a variety of different known techniques to classify individual geographic units into various terrain classifications. Some techniques may utilize supervised or unsupervised machine learning that includes trained machine learning models stored, for instance, in index 130. These techniques may include but are not limited to application of multivariate statistics to local relief gradients, fuzzy k-means, morphometric parameterization and artificial neural networks, and so forth. Other techniques may not utilize machine learning.

In some implementations, terrain classification engine 128 may classify individual geographic units with terrain classifications based on traces or fingerprints of various domain values over time. For example, in some implementations, terrain classification engine 128 may determine, across pixels of a corpus of digital images captured over time, spectral-temporal data fingerprints or traces of the individual geographic units corresponding to each individual pixel. Each fingerprint may include, for instance, a sequence of values within a particular spectral domain across a temporal sequence of digital images (e.g., a feature vector of spectral values).

As an example, suppose a particular geographic unit includes at least a portion of a deciduous tree. In a temporal sequence of satellite images of the geographic area that depict this tree, the pixel(s) associated with the particular geographic unit in the visible spectrum (e.g., RGB) will sequentially have different values as time progresses, with spring and summertime values being more green, autumn values possibly being orange or yellow, and winter values being gray, brown, etc. Other geographic units that also include similar deciduous trees may also exhibit similar domain traces or fingerprints. Accordingly, in various implementations, the particular geographic unit and/or other similar geographic units may be classified, e.g., by terrain classification engine 128, as having a terrain classification such as "deciduous," "vegetation," etc., based on their matching spectral-temporal data fingerprints.

Obstruction replacement engine 132 may be configured to generate obstruction-free versions of digital images in which those pixels that depict clouds, snow, or other transient obstructions are replaced with replacement data that estimates/predicts the actual terrain that underlies these pixels. Obstruction replacement engine 132 may use a variety of different techniques to generate transient-obstruction-free versions of digital images.

For example, in some implementations, obstruction replacement engine 132 may be configured to determine, e.g., based on output provided by transient obstruction detection engine 124, one or more obscured pixels of a high-elevation digital image that align spatially with one or more obscured geographic units of the geographic area that are obscured in the digital image by one or more transient obstructions. Obstruction replacement engine 132 may then determine, e.g., across pixels of a corpus of digital images that align spatially with the one or more obscured geographic units, one or more spectral-temporal data fingerprints of the one or more obscured geographic units. For example, in some implementations, terrain classification engine 128 may classify two or more geographic units having matching spectral-temporal fingerprints into the same terrain classification.

Obstruction replacement engine 132 may then identify one or more unobscured pixels of the same high-elevation digital image, or of a different high elevation digital image that align spatially with one or more unobscured geographic units that are unobscured by transient obstructions. In various implementations, the unobscured geographic units may be identified because they have spectral-temporal data fingerprints that match the one or more spectral-temporal data fingerprints of the one or more obscured geographic units. For example, obstruction replacement engine 132 may seek out other pixels of the same digital image or another digital image that correspond to geographic units having the same (or sufficiently similar) terrain classifications.

In various implementations, obstruction replacement engine 132 may calculate or "harvest" replacement pixel data based on the one or more unobscured pixels. For example, obstruction replacement engine may take an average of all values of the one or more unobscured pixels in a particular spectrum and use that value in the obscured pixel. By performing similar operations on each obscured pixel in the high-elevation digital, obstruction replacement engine 132 may be able to generate a transient-obstruction-free version of the digital image in which data associated with obscured pixels is replaced with replacement pixel data calculated based on other, unobscured pixels that depict similar terrain (e.g., same terrain classification, matching spectral-temporal fingerprints, etc.).

In some implementations, obstruction replacement engine 132 may employ one or more trained machine learning models that are stored in one or more indexes 134 to generate obstruction-free versions of digital images. A variety of different types of machine learning models may be employed. For example, in some implementations, collaborative filtering and/or matrix factorization may be employed, e.g., to replace pixels depicting transient obstructions with pixel data generated from other similar-yet-unobscured pixels, similar to what was described previously. In some implementations, matrix factorization techniques such as the following equation may be employed:

$$\hat{r}_{ui} = \mu + b_i + b_u + q_i^T p_u$$

wherein r represents the value of a pixel in a particular band if it were not covered by clouds, µ represents global average value in the same band, b represents the systematic bias, i and u represent the pixel's id and timestamp, T represents matrix transpose, and q and p represent the low-dimension semantic vectors (or sometimes called "embeddings"). In some implementations, temporal dynamics may be employed, e.g., using an equation such as the following:

$$\hat{r}_{ui}(t) = \mu + b_i(t) + b_u(t) + q_i^T p_u(t)$$

wherein t represents a non-zero integer corresponding to a unit of time. Additionally or alternatively, in some implementations, generative adversarial networks, or "GANs," may be employed, e.g., by obstruction replacement engine 132, in order to train one or more models stored in index 134. A more detailed description of how GANs may be used in this manner is provided with regard to FIG. 3.

In some implementations, a transient obstruction generation engine 138 may be provided that is configured to generate synthetic obstructions such as clouds, snow, etc. that may be incorporated into digital images (e.g., used to augment, alter, and/or replace pixel values in one or more spectrums) for a variety of different purposes. In some implementations, digital images with baked-in synthetic transient obstructions may be used as training data to train one or more machine learning models used by other components of high elevation digital image processing system 102.

For example, in some implementations, a machine learning model employed by obstruction replacement engine 132 and stored in index 134 may be trained as follows. An obstruction-free (e.g., cloudless) high-elevation digital image of a geographic area may be retrieved. Based on the obstruction-free digital image, transient obstruction generation engine 138 may generate, e.g., using one or trained more machine learning models described below, a training example that includes the obstruction-free image with baked in synthetic transient obstructions such as clouds. This training example may be applied, e.g., by obstruction replacement engine 132, as input across one or more machine learning models stored in index 134 to generate output. The output may be compared to the original obstruction-free digital image to determine a difference or error. This error may be used to perform operations such as back propagation and/or gradient descent to train the machine learning model to remove transient obstructions such as clouds and replace them with predicted terrain data.

As another example, in some implementations, a machine learning model employed by transient obstruction detection engine 124 and stored in index 126 may be trained as follows. An obstruction-free (e.g., cloudless) high-elevation digital image of a geographic area may be retrieved. Based on the obstruction-free digital image, transient obstruction generation engine 138 may generate, e.g., using one or trained more machine learning models described below, a training example that includes the obstruction-free image with baked-in synthetic transient obstructions such as clouds. The location of the synthetic transient obstruction will be known because it is synthetic, and thus is available, e.g., from transient obstruction generation engine 138. Accordingly, in various implementations, the training example may be labeled with the known location(s) (e.g., pixels) of the synthetic transient obstruction. The training example may then be applied, e.g., by transient obstruction detection engine 124, as input across one or more machine learning models stored in index 134 to generate output indicative of, for instance, a cloud mask. The output may be compared to the known synthetic transient obstruction location(s) to determine a difference or error. This error may be used to perform operations such as back propagation and/or gradient descent to train the machine learning model to generate more accurate cloud masks.

Transient obstruction generation engine 138 may use a variety of different techniques to generate synthetic transient obstructions such as clouds. For example, in various implementations, transient obstruction generation engine 138 may use particle systems, voxel models, procedural solid noise techniques, frequency models (e.g., low albedo, single scattering approximation for illumination in a uniform medium), ray trace volume data, textured ellipsoids, isotropic single scattering approximation, Perlin noise with alpha blending, and so forth. In some implementations, transient obstruction generation engine 138 may use GANs to generate synthetic clouds, or at least to improve generation of synthetic clouds. More details about such an implementation are provided with regard to FIG. 4. Transient obstruction generation engine 138 may be configured to add synthetic transient obstructions to one or more multiple different spectral bands of a high-elevation digital image. For example, in some implementations transient obstruction generation engine 138 may add clouds not only to RGB spectral band(s), but also to NIR spectral band(s).

Data fusion engine 142 may be configured to generate synthetic high-elevation digital images by fusing data from high-elevation digital images of disparate spatial, temporal, and/or spectral frequencies. For example, in some implementations, data fusion engine 142 may be configured to analyze MODIS and Sentinel-2 data to generate synthetic high-elevation digital images that have spatial and/or spectral resolutions approaching or matching those of images natively generated by Sentinel-2 based at least in part on data from images natively generated by MODIS. FIGS. 7A-D, 8A-D, 9, and 10, as well as the accompanying disclosure, will demonstrate operation of data fusion engine 142.

In this specification, the term "database" and "index" will be used broadly to refer to any collection of data. The data of the database and/or the index does not need to be structured in any particular way and it can be stored on storage devices in one or more geographic locations. Thus, for example, the indices 126, 130, 134, 140, 154, and 156 may include multiple collections of data, each of which may be organized and accessed differently.

Crop yield and diagnosis system 144 may be configured to practice selected aspects of the present disclosure to provide users, e.g., a user interacting with crop prediction client 109, with data related to crop yield predictions, forecasts, diagnoses, recommendations, and so forth. In various implementations, crop yield and diagnosis system 144 may include a training module 150 and an inference module 152. In other implementations, one or more of modules 150 or 152 may be combined and/or omitted.

Training module 150 may be configured to train one or more machine learning models to generate data indicative of crop yield predictions. These machine learning models may be applicable in various ways under various circumstances. For example, one machine learning model may be trained to generate crop yield predictive data for a first crop, such as spinach, soy, etc. Another machine learning model may be trained to generate crop yield predictive data for a second crop, such as almonds, corn, wheat, etc. Additionally or alternatively, in some implementations, a single machine learning model may be trained to generate crop yield predictive data for multiple crops. In some such implementations, the type of crop under consideration may be applied as input across the machine learning model, along with other data described herein.

The machine learning models trained by training model 150 may take various forms. In some implementations, one or more machine learning models trained by training model 150 may come in the form of memory networks. These may include, for instance, recurrent neural networks, long short-term memory ("LSTM") neural networks, gated recurrent unit ("GRU") neural networks, and any other type of artificial intelligence model that is designed for application of sequential data, iteratively or otherwise. In various implementations, training module 150 may store the machine learning models it trains in a machine learning model database 154.

In some implementations, training module 150 may be configured to receive, obtain, and/or retrieve training data in the form of observational and/or operational data described herein and iteratively apply it across a neural network (e.g., memory neural network) to generate output. Training module 150 may compare the output to a ground truth crop yield, and train the neural network based on a difference or "error" between the output and the ground truth crop yield. In some implementations, this may include employing techniques such as gradient descent and/or back propagation to adjust various parameters and/or weights of the neural network.

Inference module 152 may be configured to apply input data across trained machine learning models contained in machine learning module database 154. These may include machine learning models trained by training engine 150 and/or machine learning models trained elsewhere and uploaded to database 154. Similar to training module 150, in some implementations, inference module 152 may be configured to receive, obtain, and/or retrieve observational and/or operational data and apply it (e.g., iteratively) across a neural network to generate output. Assuming the neural network is trained, then the output may be indicative of a predicted crop yield.

Training module 150 and/or inference module 152 may receive, obtain, and/or retrieve input data from various sources. This data may include both observational data and operational data. As noted previously, "operational" data may include any factor that is human-induced/controlled and that is likely to influence crop yields. Operational data relates to factors that can be adjusted to improve crop yields and/or to make other decisions. "Observational" data, on the other hand, may include data that is obtained from various sources (e.g., 148), including but not limited to sensors (moisture, temperature, ph levels, soil composition), agricultural workers, weather databases and services, and so forth.

A highly beneficial source of observational data may be a temporal sequence of high-elevation digital images that have sufficient spatial resolution and temporal frequency such that when they are applied as input across one or more machine learning models in database 154, the models generate output that is likely to accurately predict crop yield. As noted previously, a ground truth temporal sequence of high-elevation digital images that meets these criteria may be hard to find, due to transient obstructions such as clouds, as well as due to the disparate spatial resolutions and temporal frequencies associated with various satellites. Accordingly, in some implementations, a temporal sequence of high-elevation digital images applied by training module 150 and/or inference module 152 across a machine learning model may include digital images generated and/or modified using techniques described herein to be transient-obstruction-free and/or to have sufficient spatial resolutions and/or temporal frequencies. One example demonstrating how this may be accomplished is provided in FIG. 11 and the accompanying description.

Operational data clearing house 146 may receive, store, maintain, and/or make available, e.g., in database 156, various operational data received from a variety of different sources. In some implementations, one or more sources of data 148, including farm equipment such as tractors, may log their operation and provide this data to operational data clearing house 146, e.g., by uploading their log data during downtime (e.g., every night). Additionally or alternatively, agricultural personnel such as farmers may periodically input operational data based on their own activities. This operational data may include factors such as which fertilizers or pesticides were applied, when they were applied, where they were applied, how much irrigation was applied, when irrigation was applied, which crops were planted in prior years, what/when/where other chemicals were applied, genetic data related to crops, and so forth. Additionally or alternatively, in some implementation, some operational data may be obtained from other sources, such as from the farm equipment itself (148), from individual farmers' computers (not depicted), and so forth.

Another form of observational data that may be obtained from one or more data sources 148 is ground truth data about actual crop yields achieved in the field. For example, when a crop is harvested, an accounting may be made as to what percentages, weights, or other units of measure of the total planted crops were successfully harvested, unsuccessfully harvested, spoiled, etc. This ground truth data may be used as described herein, e.g., by training engine 150, to train one or more machine learning models.

Figure 2:
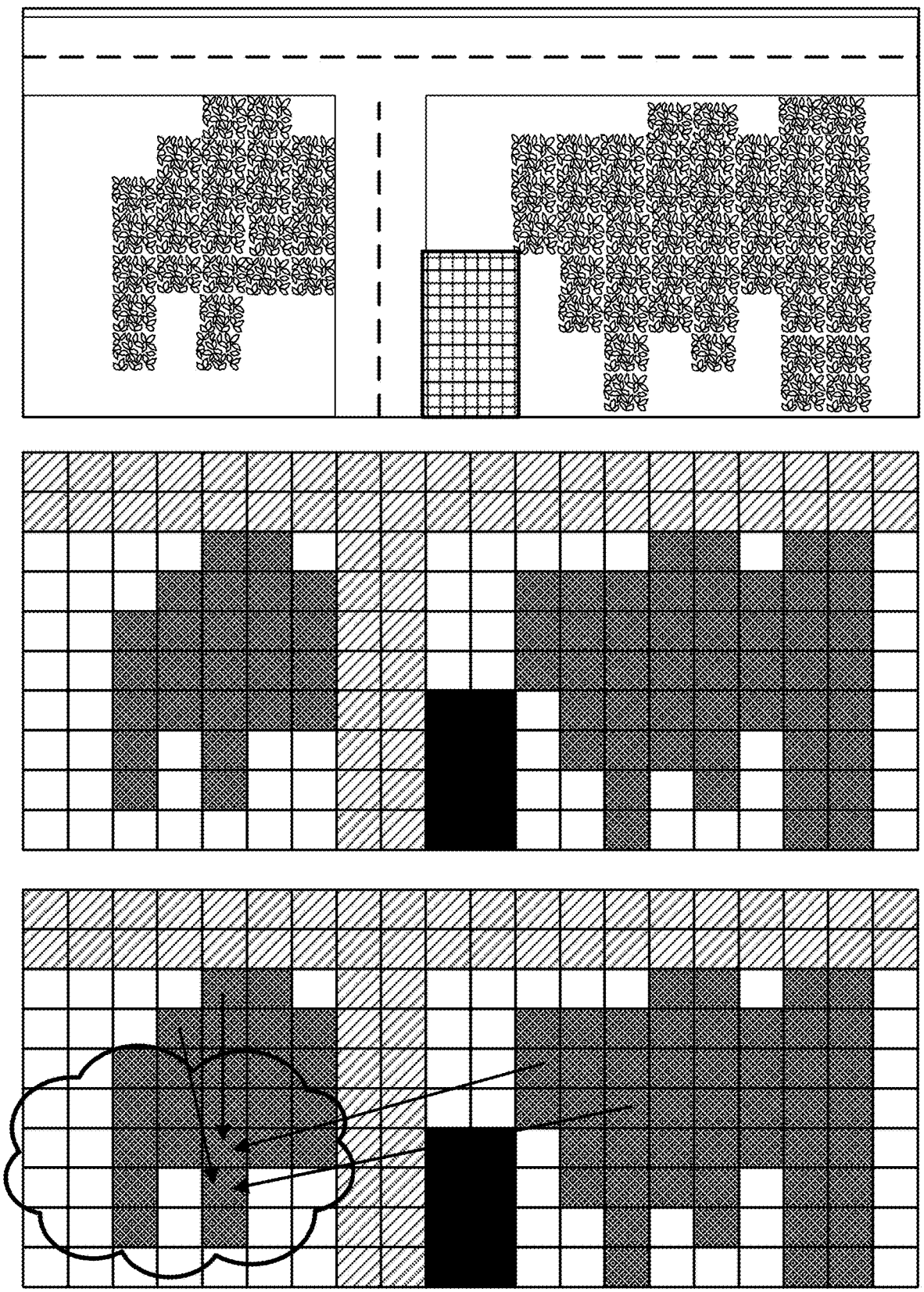
FIG. 2 depicts an example of how geographic units may be classified into terrain classifications, and how those terrain classifications can be used to generate replacement data for obscured pixels, in accordance with various implementations.

FIG. 2 depicts an example of how a ground truth high-elevation digital image (top) may be processed to classify the constituent geographic units that correspond to its pixels. In the top image, which schematically represents a high elevation digital image capturing a geographic area, a T-shaped road is visible that divides two plots of land at bottom left and bottom right. The bottom left plot of land includes a cluster of vegetation, and so does the bottom right plot. The bottom right plot also features a building represented by the rectangle with cross hatching.

The middle image demonstrates how the digital image at top may be classified, e.g., by terrain classification engine 128, into discrete terrain classifications, e.g., based on geographic units that share spectral-temporal fingerprints. The middle image is subdivided into squares that each represent a pixel that aligns spatially with a geographic unit of the top digital image. Pixels that depict roadway have been classified accordingly and are shown in a first shading. Pixels that depict the building have also been classified accordingly and are shown in black. Pixels that represent the vegetation in the bottom left and bottom right plots of land are also classified accordingly in a second shading that is slightly darker than the first shading.

The bottom image demonstrates how techniques described herein, particularly those relating to terrain classification and/or spectral-temporal fingerprint similarity, may be employed to generate replacement data that predicts/estimates terrain underlying a transient obstruction in a high elevation digital image. In the bottom images of FIG. 2, a cloud has been depicted schematically primarily over the bottom left plot of land. As indicated by the arrows, two of the vegetation pixels (five columns from the left, three and four rows from bottom, respectively) that are obscured by the cloud can be replaced with data harvested from other, unobscured pixels. For example, data associated with the obscured pixel five columns from the left and three rows from bottom is replaced with replacement data that is generated from two other unobscured pixels: the pixel four columns from left and four rows from top, and the pixel in the bottom right plot of land that is five rows from bottom, seven columns from the right. Data associated with the obscured pixel five columns from the left and four rows from bottom is replaced with replacement data that is generated from two other unobscured pixels: the pixel five columns from left and three rows from top, and the pixel in the bottom right plot of land that is five rows from top and nine columns from the right.

Of course these are just examples. More or less unobscured pixels may be used to generate replacement data for obscured pixels. Moreover, it is not necessary that the unobscured pixels that are harvested for replacement data be in the same digital image as the obscured pixels. It is often (but not always) the case that the unobscured pixels may be contained in another high elevation digital image that is captured nearby, for instance, with some predetermined distance (e.g., within 90 kilometers). Or, if geographic units that are far away from each other nonetheless have domain fingerprints that are sufficiently similar, those faraway geographic units may be used to harvest replacement data.

Figure 3:
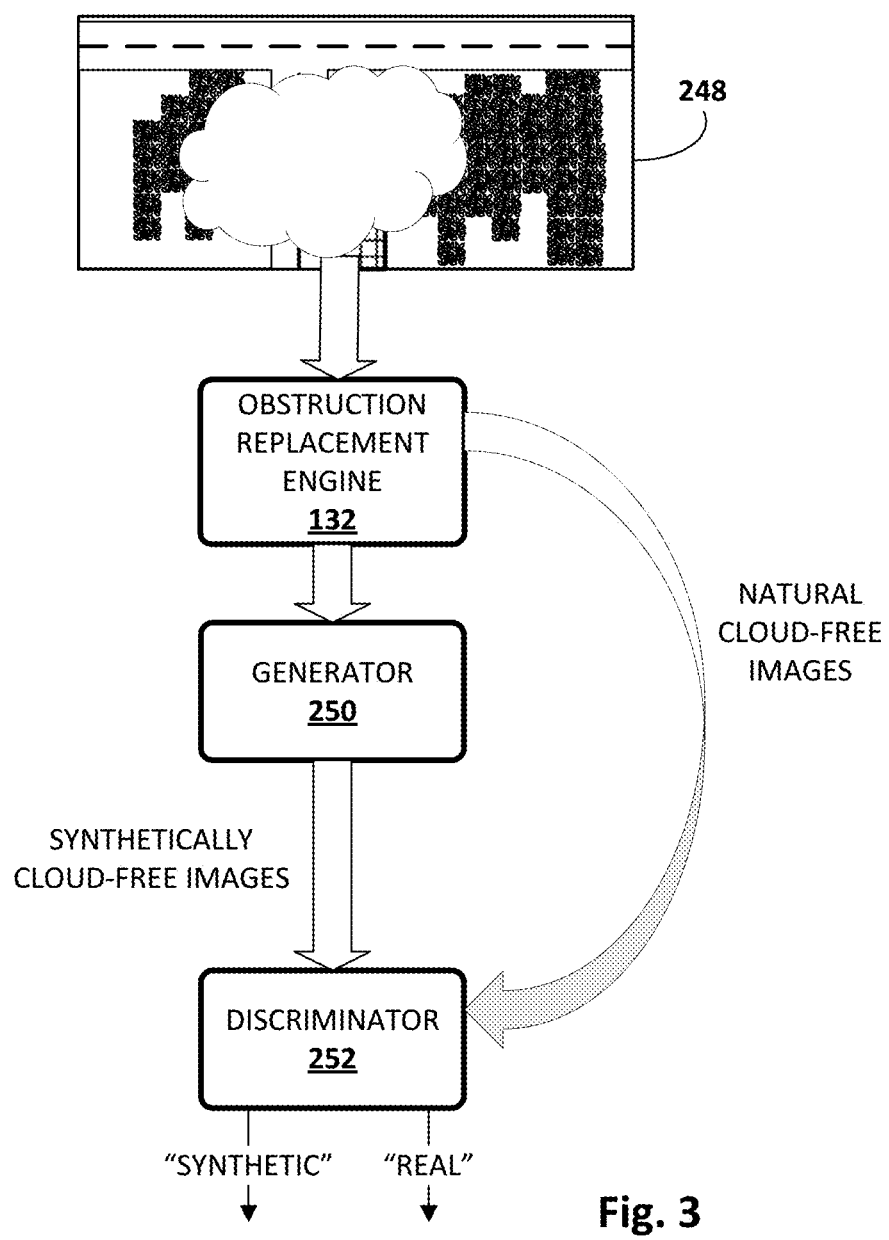
FIG. 3 depicts one example of how generative adversarial networks can be used to generate obstruction-free high-elevation digital images.

FIG. 3 depicts an example of how GANs may be used to train a generator model 250 employed by obstruction replacement engine 132, in accordance with various implementations. In various implementations, obstruction replacement engine 132 may retrieve one or more high elevation digital images 248 and apply them as input across generator model 250. Generator model 250 may take various forms, such as an artificial neural network. In some implementations, generator model 250 may take the form of a convolutional neural network.

Generator model 250 may generate output in the form of synthetically cloud-free (or more generally, transient obstruction-free) images. These images may then be applied as input across a discriminator model 252. Discriminator model 252 typically will take the same form as generator model 250, and thus can take the form of, for instance, a convolutional neural network. In some implementations, discriminator model 252 may generate binary output that comprises a "best guess" of whether the input was "synthetic" or "natural" (i.e., ground truth). At the same time, one or more natural, cloud-free (or more generally, transient obstruction-free) images (i.e., ground truth images) may also be applied as input across discriminator model 252 to generate similar output. Thus, discriminator model 252 is configured to analyze input images and make a best "guess" as to whether the input image contains synthetic data (e.g., synthetically-added clouds) or represents authentic ground truth data.

In various implementations, discriminator model 252 and generator model 250 may be trained in tandem, e.g., in an unsupervised manner. Output from discriminator model 252 may be compared to a truth about the input image (e.g., a label that indicates whether the input image was synthesized by generator 250 or is ground truth data). Any difference between the label and the output of discriminator model 252 may be used to perform various training techniques across both discriminator model 252 and generator model 250, such as back propagation and/or gradient descent, to train the models.

In other implementations, one or more recurrent neural networks or other memory networks (e.g., long short-term memory, or "LSTM") that are able to account for multi-temporal input may be used, e.g., by obstruction replacement engine 132, to generate replacement data that "fills in the gaps" as described in the summary. For example, in some implementations, each spatio-spectral "slice" of the 3D array structure described elsewhere herein (i.e., data extracted from each digital image of multiple digital images captured over time) may be applied as input across a recurrent neural network to generate output. This output may be combined (e.g., concatenated) with a "next" slice of the 3D array structure and applied, e.g., by obstruction replacement engine 132, as input across the same recurrent neural network to generate additional output. This may continue across a whole temporal sequence of digital images captured of a geographic area. At each turn, the output may "predict" what the next slice will look like. When the next slice in actuality includes transient obstruction(s) such as clouds, the predicted output can be used to generate replacement data for the obscured pixels.

Figure 4:
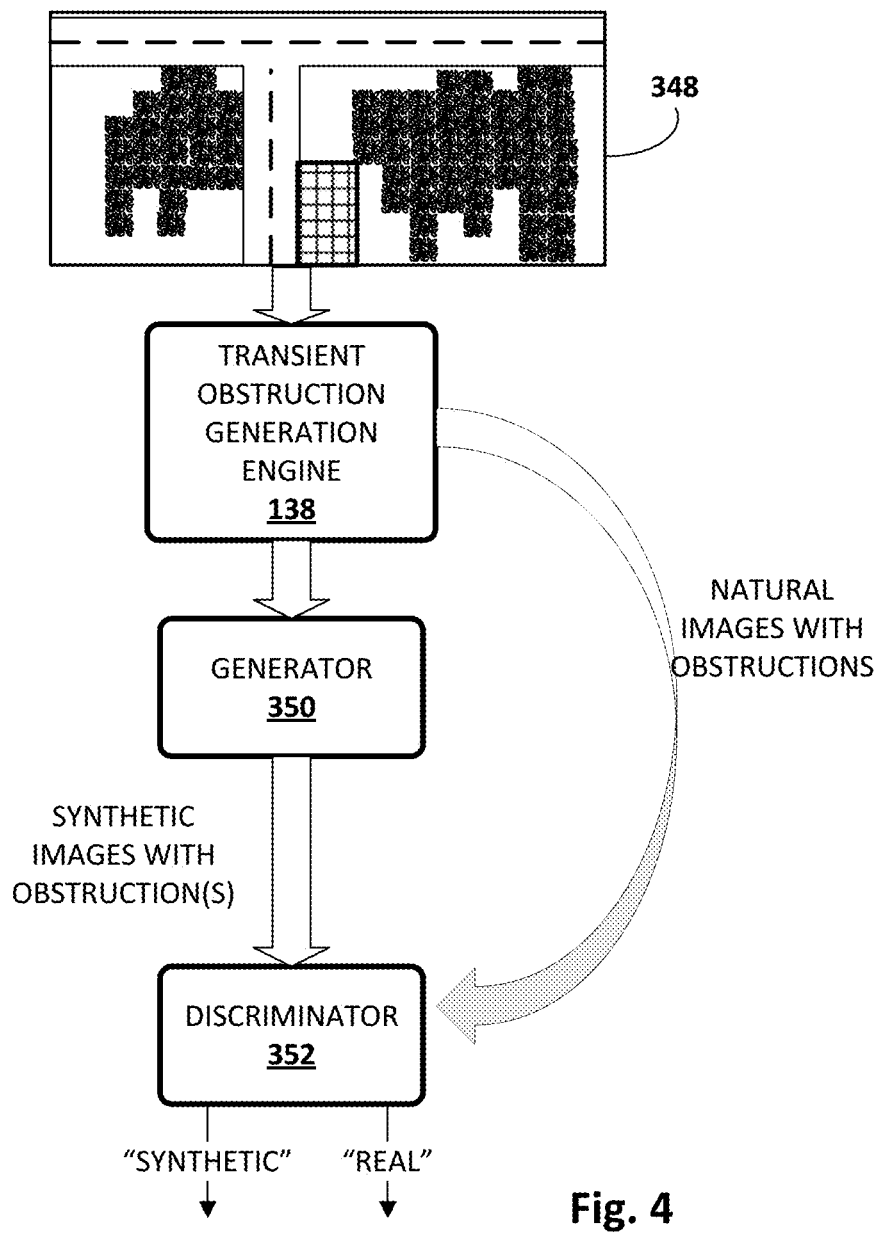
FIG. 4 depicts another example of how generative adversarial networks can be used to generate synthetic transient obstructions, e.g., for purposes of training various machine learning models described herein.

FIG. 4 schematically depicts an example of how GANs may be used to train one or more machine learning models employed by transient obstruction generation engine 138, in accordance with various implementations. Similar to FIG. 3, transient obstruction generation engine 138 may utilize a generator model 350 and a discriminator model 352, which may or may not take similar forms as models 250-252. In this example, transient obstruction generation engine 138 may retrieve one or more obstruction-free ground truth high-elevation digital images 348 and apply them as input across generator model 350 to generate synthetic images that include baked-in synthetic obstructions such as clouds. These synthetic images may then be applied as input across discriminator model 352, along with natural, ground truth images that also include obstructions. Similar to before, discriminator model 352 may be configured to generate output that constitutes a "guess" as to whether an input digital image is "synthetic" (e.g., generated by generator model 350) or "natural." These models 350-352 may be trained in a manner similar to that described above with regard to models 250-252.

Figure 5:
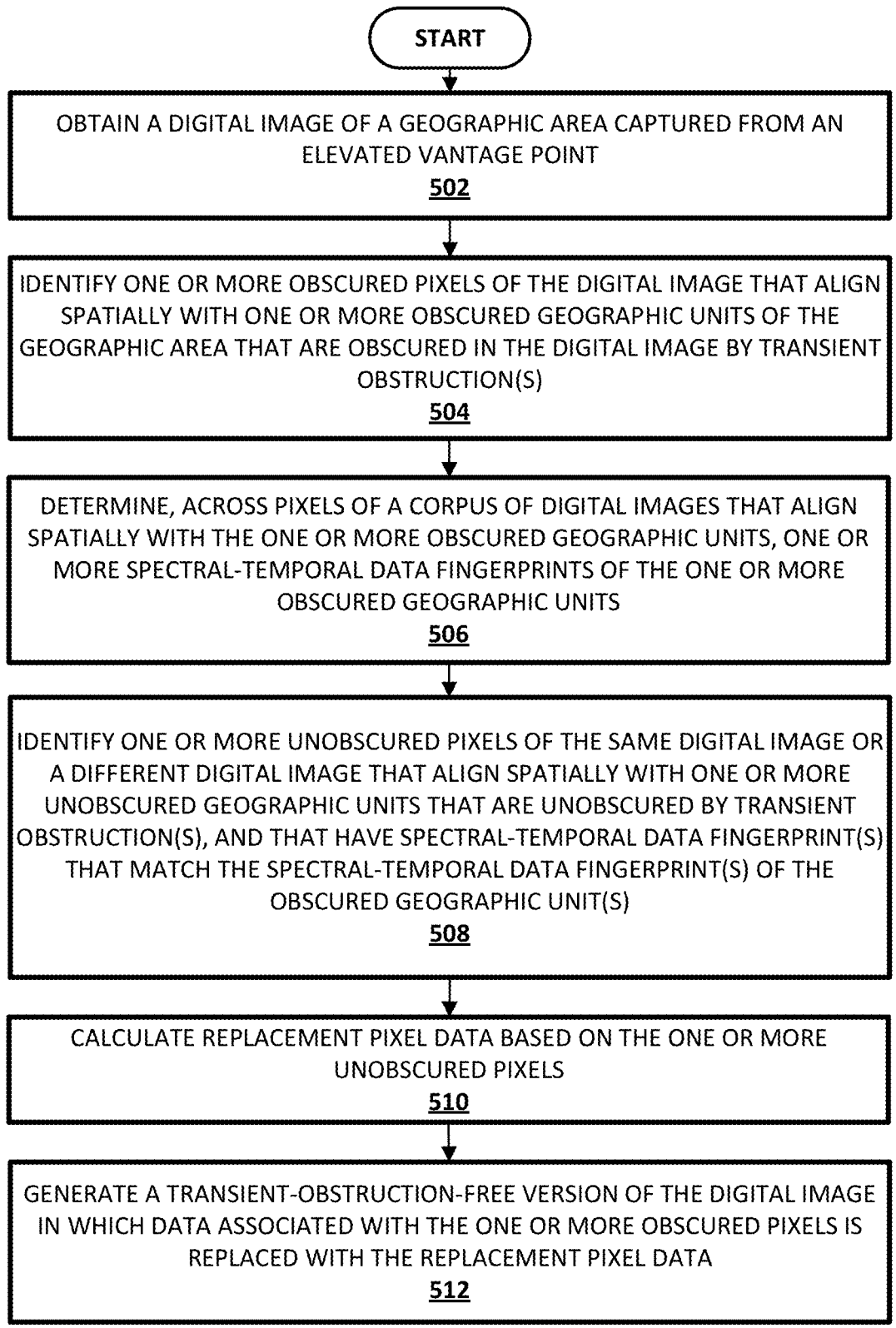
FIG. 5 depicts a flow chart illustrating an example method of practicing selected aspects of the present disclosure, in accordance with various implementations.

Referring now to FIG. 5, one example method 500 of performing selected aspects of the present disclosure is described. For convenience, the operations of the flow chart are described with reference to a system that performs the operations. This system may include various components of various computer systems, including various engines described herein. Moreover, while operations of method 500 are shown in a particular order, this is not meant to be limiting. One or more operations may be reordered, omitted or added.

At block 502, the system may obtain a digital image of a geographic area captured from an elevated vantage point. In various implementations, the digital image may include a plurality of pixels that align spatially with a respective plurality of geographic units of the geographic area.

At block 504, the system, e.g., by way of transient obstruction detection engine 124, may identify one or more obscured pixels of the digital image that align spatially with one or more obscured geographic units of the geographic area that are obscured in the digital image by one or more transient obstructions. Put another way, pixels that depict a portion of a cloud or other transient obstruction are identified, e.g., by transient obstruction detection engine 124 using one or more techniques described previously.

At block 506, the system, e.g., by way of terrain classification engine 128, may determine, across pixels of a corpus of digital images that align spatially with the one or more obscured geographic units, one or more spectral-temporal data fingerprints of the one or more obscured geographic units. For example, in some implementations, a ("3D") array structure may have been assembled previously for the geographic area, e.g., based on multiple digital images captured of the geographic area. Each row of the 3D array may represent a particular pixel (and spatially corresponding geographic unit). Each column of the array may correspond to, for instance, a different digital image captured at a different time. Each unit in the third dimension of the 3D array may correspond to different spectral frequencies that are available in the digital images, such as red, green, blue, near infrared ("IR"), mid-TR, far-IR, thermal IR, microwave, and/or radar. In various implementations, this 3D array structure may be used at block 306 to determine domain fingerprints, such as spectral-temporal fingerprints, of individual geographic units.

At block 508, the system, e.g., by way of obstruction replacement engine 132, may identify one or more unobscured pixels of the same digital image or a different digital image that align spatially with one or more unobscured geographic units of the same or different geographic area that are unobscured by transient obstructions. In various implementations, the unobscured geographic units may have one or more spectral-temporal data fingerprints that match the one or more spectral-temporal data fingerprints of the one or more obscured geographic units that were determined at block 506.

At block 510, the system may calculate replacement pixel data based on the one or more unobscured pixels. For example, an average of values across the unobscured pixels within a particular spectrum, or across multiple spectra, may be used. Additionally or alternatively, in some implementations, a single pixel that is "closest" (e.g., has a most similar domain fingerprint) to the unobscured pixel may simply be cloned into the obscured pixel. At block 512, the system may generate a transient-obstruction-free version of the digital image in which data associated with the one or more obscured pixels is replaced with the replacement pixel data.

Figure 6:
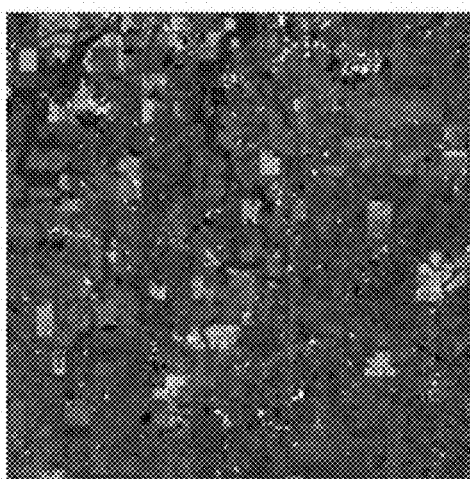
FIG. 6 depicts an example of how techniques described herein may be used to generate a transient-obstruction-free version of a high-elevation digital image that is at least partially obscured by transient obstruction(s).
Figure 6:
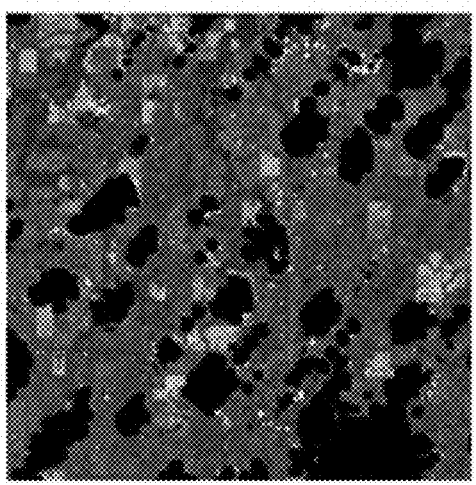
Figure 6:
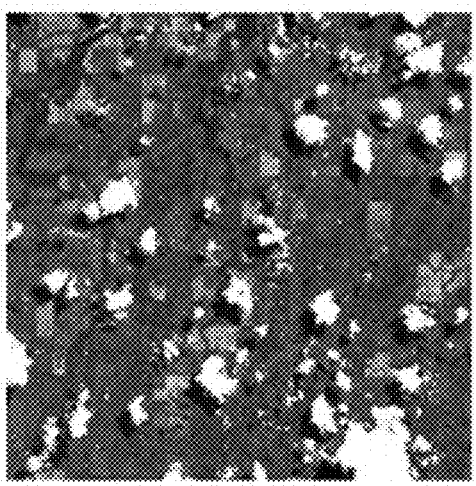

FIG. 6 depicts an example of how techniques described herein may be used to generate a transient-obstruction-free version of a high-elevation digital image. On the left, a digital image captured from a high elevation (e.g., a satellite) depicts a geographic area. It also can be seen that a number of clouds are positioned between the ground surface and the vantage point of the satellite, and therefore obstruct portions of the geographic area from view. In addition it can be seen the shadows cast by the clouds also obstruct additional portions of the geographic area.

In the middle image a cloud mask has been detected, e.g., by transient obstruction detection engine 124. The cloud mask has been used to remove obscured pixels that correspond to the clouds or their respective shadows. Put another way, the obscured pixels that align spatially with the geographic units that are obscured by the clouds or their respective shadows have been removed (e.g., values set to black, zeroed out, etc.). In the right image, the removed pixels have been replaced with replacement data generated using techniques described herein. As explained herein, this replacement data estimates the terrain underlying the obscured pixels.

FIGS. 7A-D schematically demonstrate another similar technique for performing transient obstruction removal. In FIGS. 7A-D (and in FIGS. 8A-D), the axes are meant to represent feature (e.g., green, blue, red, etc.) spaces, e.g., in latent space. In various implementations, the input for this transient obstruction removal technique may include: 1) a cloud free digital image; 2) a cloud-obstructed digital image; and 3) a cloud mask. The cloud mask may be computed, e.g., by transient obstruction detection engine 124, from the cloud-obstructed digital image using various techniques, such as those described herein.

Figure 7A:
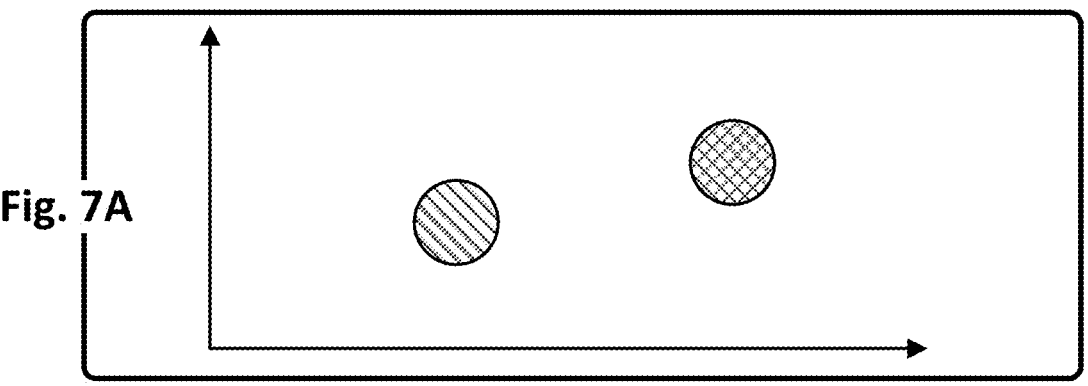
FIG. 7A, FIG. 7B, FIG. 7C, and FIG. 7D schematically depict another technique for removing transient obstructions from high-elevation digital images, in accordance with various implementations.
Figure 7B:
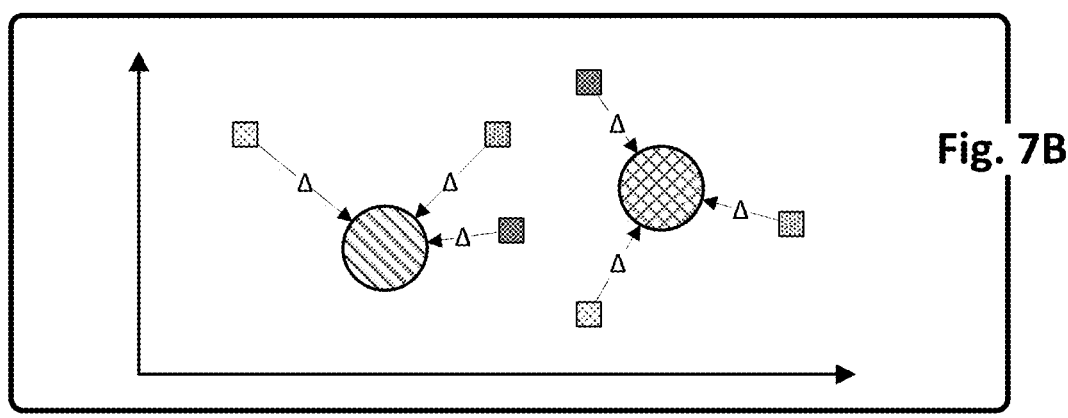

For the cloud free image, clustering may be performed, e.g., on all of the sub-bands of the image data. Various clustering techniques may be employed, such as K-means and/or other clustering techniques described herein. In some implementations, it is not required that the clusters be generated across a temporal sequence of high-elevation images, as was the case with some of the other transient obstruction-removal techniques described herein. Instead, clusters may be identified in a single cloud-free high-elevation digital image, and then those clusters may be used as described below to remove a transient obstruction from another high-elevation digital image that includes transient obstruction(s). The cluster centers (e.g., centroids) may be calculated, as depicted in FIG. 7A (which only depicts two cluster centers for the sake of brevity and clarity). In some implementations, these clusters may be classified, e.g., by terrain classification engine 128, as terrain types, e.g., using crop types from the CDL layer.

Figure 7C:
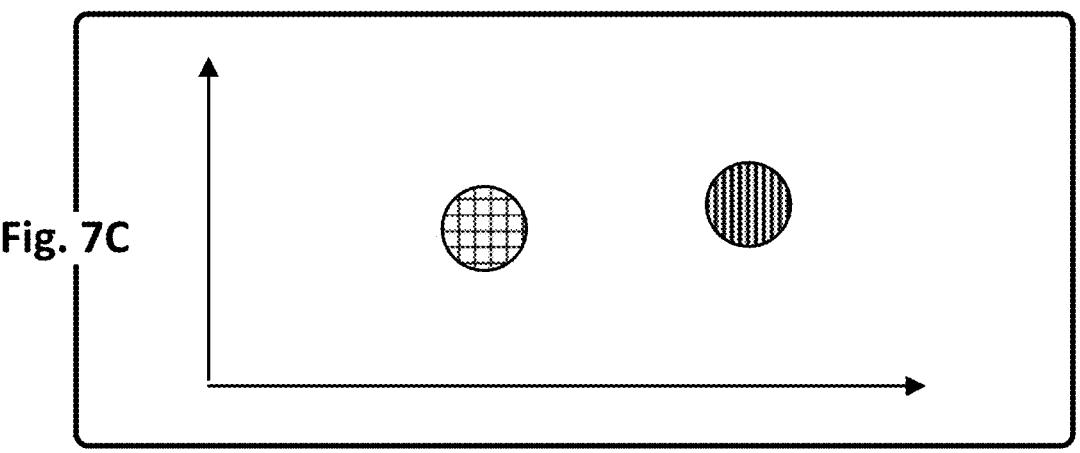
Figure 7D:
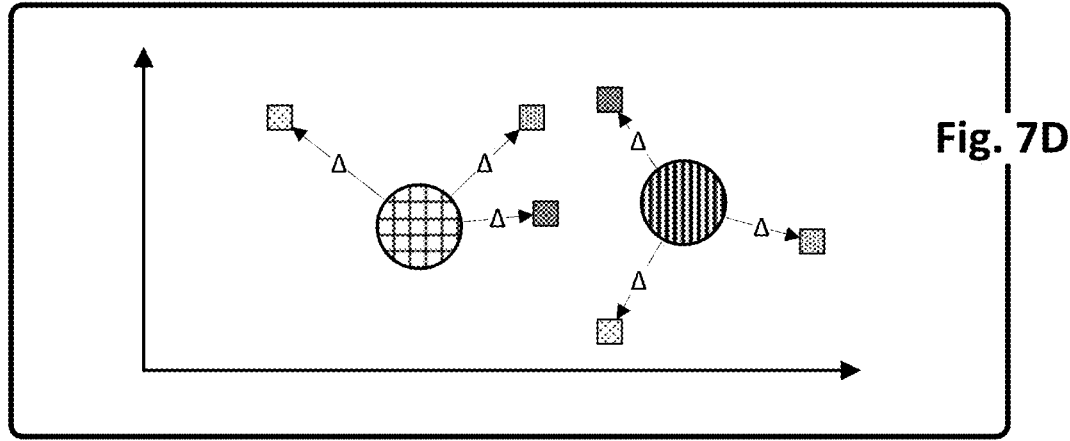

For the cloud-free high-elevation digital image, a distance or delta (Δ) may be computed from each individual pixel of the cluster to the centroid. This is demonstrated in FIG. 7B, in which three example pixels and their respective deltas from the pixel cluster centroid are depicted. These deltas may be preserved, e.g., in memory, for subsequent operations described below. Next, for the cloud-obstructed digital image and cloud mask, pixel clusters and their respective centroids may be computed for pixels that are unobstructed. Two examples of such unobstructed centroids are depicted in FIG. 7C. Finally, with the cloud-obstructed digital image and cloud mask, the values of the obstructed pixels in the cloud-obstructed digital image may be computed for each spectral sub-band. For example, and as shown in FIG. 7D, the values of the obstructed pixels in the cloud-obstructed digital image may be computed by offsetting the pixel cluster centroids computed as depicted in FIG. 7C by the deltas depicted in FIG. 7B.

In another aspect, and as noted previously, techniques are described herein for generating, e.g., by data fusion engine 142, synthetic high-elevation digital images by fusing data from multiple temporal sequences of high-elevation digital images, e.g., with disparate resolutions in the temporal, spatial, and/or spectral domains. For example, various data temporal sequences of high-elevation images acquired by MODIS (lower spatial resolution, higher temporal frequency) and the Sentinel-2 (higher spatial resolution, lower temporal frequency) systems may be fused to generate synthetic high-elevation digital images at spatial and/or spectral resolutions that approach or match those of the Sentinel-2 digital images.

In various implementations, a first temporal sequence of high-elevation digital images, e.g., acquired by MODIS or another airborne vehicle with relatively high temporal frequency, may be obtained, e.g., directly from the vehicle or from one or more databases that store high elevation digital images captured by the vehicle. The first temporal sequence of high-elevation digital images may capture a geographic area, such as one or more farms, at a first temporal frequency. Each high-elevation digital image of the first temporal sequence may include a plurality of pixels that align spatially with a respective first plurality of geographic units of the geographic area. The first plurality of geographic units may have a size that corresponds to a first spatial resolution of the individual pixels of the first temporal sequence.

Similarly, a second temporal sequence of high-elevation digital images, e.g., acquired by Sentinel-2 or another airborne vehicle, may be obtained, e.g., directly from the different vehicle or from one or more databases that store high elevation digital images captured by the different vehicle. Like the first temporal sequence, the second temporal sequence of high-elevation digital images capture the geographic area, except at a second temporal frequency that is less than the first temporal frequency, and at a second spatial resolution that is greater than the first spatial resolution. In various implementations, high-elevation digital images from the first and second temporal sequences may be registered (e.g., spatially aligned) on the same geographic area using a variety of techniques, such as various mathematical models for matching corresponding features on specific spectral sub-bands, Fourier methods, GPS metadata, mutual information, relaxation methods, and so forth. As with the first temporal sequence, each high-elevation digital image of the second temporal sequence may include a plurality of pixels that align spatially with a second plurality of geographic units of the geographic area (which due to the higher resolution of the pixels may be smaller than the first plurality of geographic units).

In various implementations, a mapping may be generated of the pixels of the high-elevation digital images of the second temporal sequence to respective sub-pixels of the first temporal sequence. The mapping may be based on spatial alignment of the geographic units of the second plurality of geographic units that underlie the pixels of the second temporal sequence with portions of the geographic units of the first plurality of geographic units that underlie the respective sub-pixels.

Figure 9:
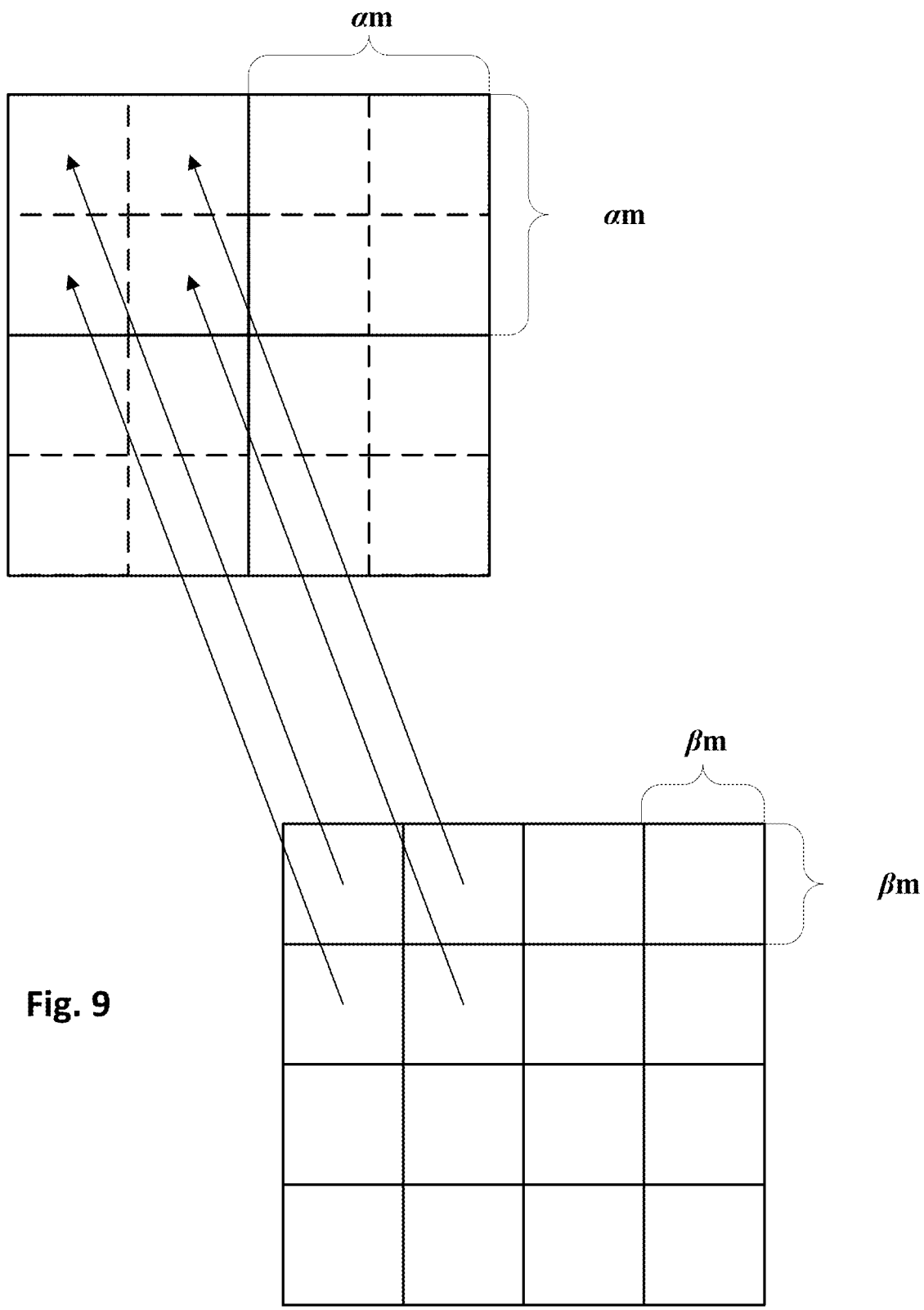
FIG. 9 schematically demonstrates an example mapping between high and low spatial resolution images.

An example of this mapping is demonstrated schematically in FIG. 9. At top, a two-by-two matrix of low-spatial resolution pixels (e.g., acquired by MODIS) is depicted in solid lines, and captures an underlying geographic area. For this example, assume that each pixel is α×α meters in size. At bottom, a four-by-four matrix of high-spatial-resolution pixels (e.g., acquired by Sentinel-2) is depicted in solid lines, and also capture the same geographic area. For this example, assume that each pixel of the bottom matrix is β×β meters in size. For the sake of simplicity, assume further that β is half of α. Thus, four pixels of the bottom matrix fit into one pixel of the top matrix. In various implementations, pixels of the top matrix (i.e., the first temporal sequence) may be subdivided into sub-pixels (shown in dashed lines) that correspond in size to pixels of the bottom matrix. Then, the bottom pixels may be mapped to the sub-pixels of the top matrix, as indicated by the arrows.

In some implementations, a next step may be to select a point in time for which a synthetic high-elevation digital image of the geographic area at the second spatial resolution will be generated. For example, a point in time at which no high-elevation digital image of the second temporal sequence, such as between two available images, may be selected, e.g., by a user operating crop prediction client 109 or another remote sensing application. A low-resolution reference digital image that was captured in closest temporal proximity to the point in time may also be selected from the first temporal sequence.

Then, in various implementations, a first deviation of ground-truth data forming the low-resolution reference digital image from corresponding data interpolated for the point in time from the first temporal sequence of high-elevation digital images may be determined. Based on the first deviation, a second deviation may be predicted of data forming the synthetic high-elevation digital image from corresponding data interpolated for the point in time from the second temporal sequence of high-elevation digital images. Then, the synthetic high-elevation digital image may be generated based on the mapping and the predicted second deviation.

This data fusion process is demonstrated schematically in FIGS. 8A-D. The input for the data fusion process includes satellite images from two sources: 1) high resolution low frequency (i.e., the second temporal sequence acquired, for example, by Sentinel-2); and 2) low resolution high frequency (i.e., the first temporal sequence acquired by, for instance, MODIS).

Figure 8A:
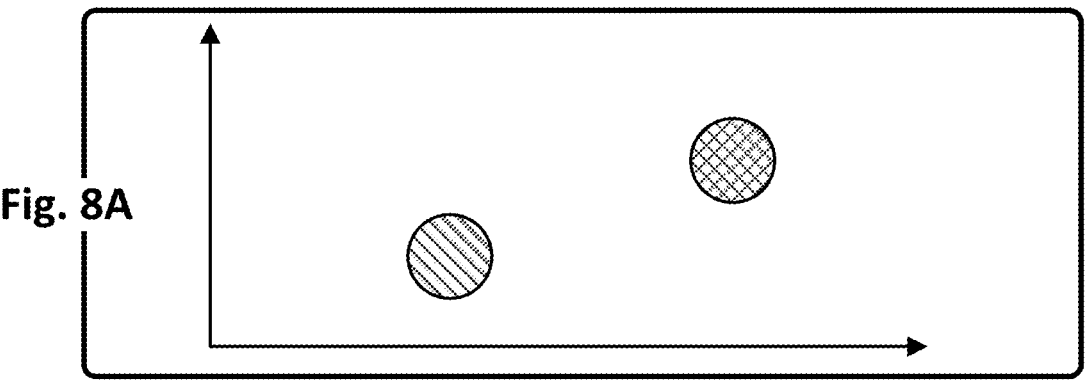
FIG. 8A, FIG. 8B, FIG. 8C, and FIG. 8D schematically demonstrate a technique for fusing data from high-elevation digital images at different domain resolutions/frequencies to generate a synthetic high-elevation digital image.

FIG. 8A demonstrates a first step. For the high spatial resolution data (e.g., second temporal sequence acquired by Sentinel), cloud free high-elevation digital images across a time interval such as a crop year may be identified. Then clustering may be performed on one or more of the sub-bands of all the high-elevation digital images of the second temporal sequence to identify pixel clusters having comparable spectral-temporal traces. Centroids of the pixel clusters may be computed and recorded, as illustrated in FIG. 8A (which only depicts two cluster centroids for the sakes of brevity and clarity). In some cases these pixel clusters may be terrain classified, e.g., using CDL layer data for the classes. Notably, these clustering operations are different from those of FIGS. 7A-D (cloud removal) because temporal data is taken into account (i.e. spectral-temporal traces).

Figure 8B:
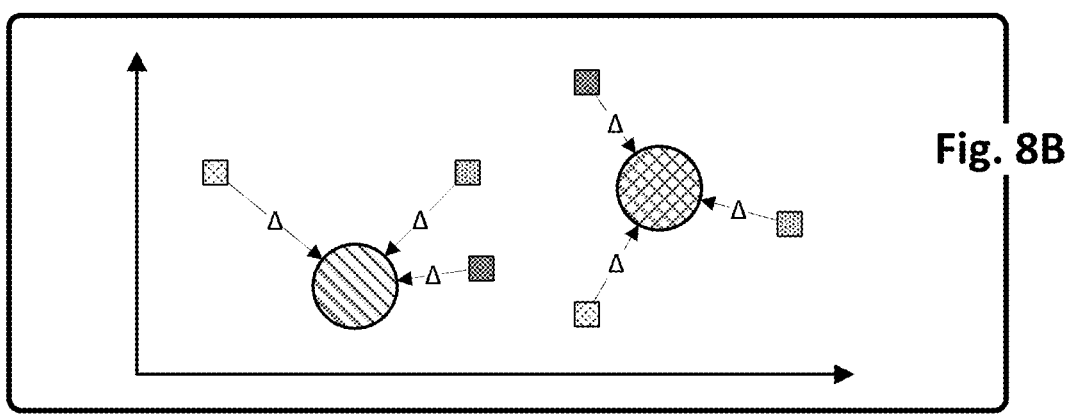

FIG. 8B demonstrates the next step, in which cloud-free digital images of the second temporal sequence are used to compute deltas (A) from each pixel to a centroid of the pixel cluster of which they are members. These deltas may be preserved for future use. This operation may be similar to those described with regard to FIGS. 7A-D in many respects.

Figure 8C:
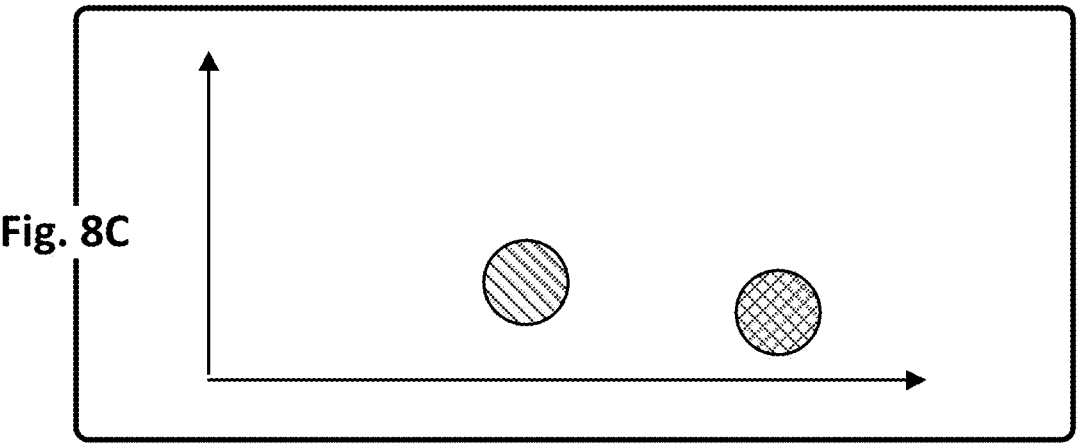

Next, and as demonstrated in FIG. 8C, for high-elevation digital images of the first temporal sequence (low spatial resolution, high temporal frequency, e.g., captured by MODIS) that are free of transient obstructions such as clouds, the pixel clusters may identified, similar to described above with respect to FIGS. 7A-D. Then, and as demonstrated in FIG. 8D, for the synthetic high-elevation digital image being computed (represented in FIG. 8D by the dark grey circle 866 in the center), its deviation (B in FIG. 8D) from an interpolated value 870 (e.g., linearly interpolated from first and second high-resolution anchor images 880A, 880B) is set to be proportionate to a deviation (A in FIG. 8D) of the temporally-corresponding low resolution image 868 (ground truth data from first temporal sequence) from an interpolated value 872 (e.g., interpolated from first and second low-resolution anchor images 882A, 882B).

Figure 10:
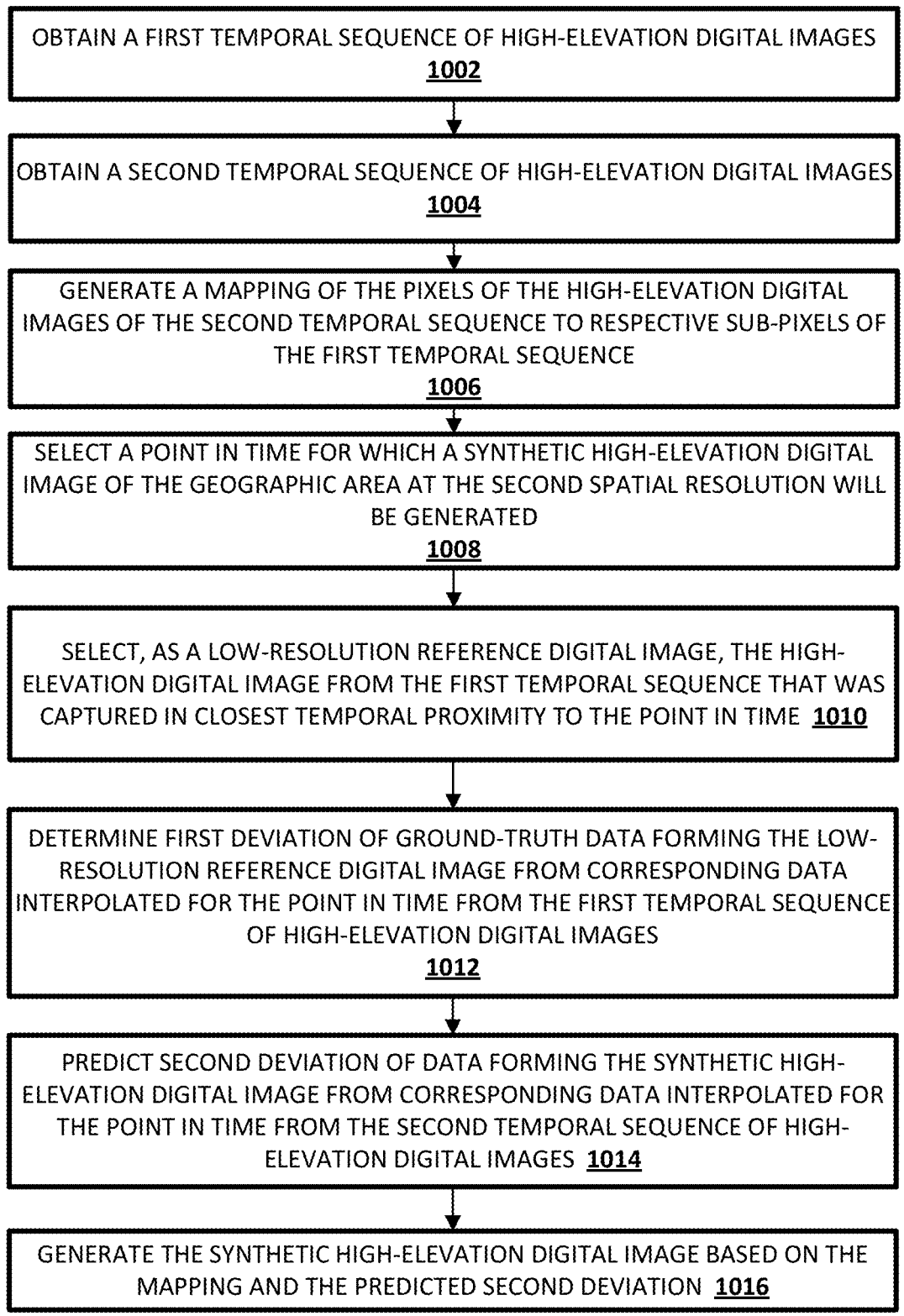
FIG. 10 depicts a flow chart illustrating an example method of practicing selected aspects of the present disclosure, in accordance with various implementations.

FIG. 10 illustrates a flowchart of an example method for practicing selected aspects of the present disclosure, including operations performed by data fusion engine 142. The steps of FIG. 10 can be performed by one or more processors, such as one or more processors described herein. Other implementations may include additional steps than those illustrated in FIG. 10, may perform step(s) of FIG. 10 in a different order and/or in parallel, and/or may omit one or more of the steps of FIG. 10. For convenience, the operations of FIG. 10 will be described as being performed by a system configured with selected aspects of the present disclosure.

At block 1002, the system may obtain a first temporal sequence of high-elevation digital images, e.g., from MODIS or another source of relatively high temporal frequency, low spatial/spectral resolution digital images. At block 1004, the system may obtain a second temporal sequence of high-elevation digital images, e.g., from Sentinel-2 or another source of relatively low temporal frequency but relatively high spatial/spectral resolution images.

At block 1006, the system may generate a mapping of the pixels of the high-elevation digital images of the second temporal sequence to respective sub-pixels of the first temporal sequence, e.g., as depicted in FIG. 8. In various implementations, the mapping may be based on spatial alignment of the geographic units of the second plurality of geographic units that underlie the pixels of the second temporal sequence with portions of the geographic units of the first plurality of geographic units that underlie the respective sub-pixels.

At block 1008, the system (e.g., based on user input) may select a point in time for which a synthetic high-elevation digital image of the geographic area at the second spatial resolution will be generated. For example, a point in time may be selected at which no Sentinel-2 image is available. At block 1010, the system may select, as a low-resolution reference digital image, the high-elevation digital image from the first temporal sequence that was captured in closest temporal proximity to the point in time.

Figure 8D:
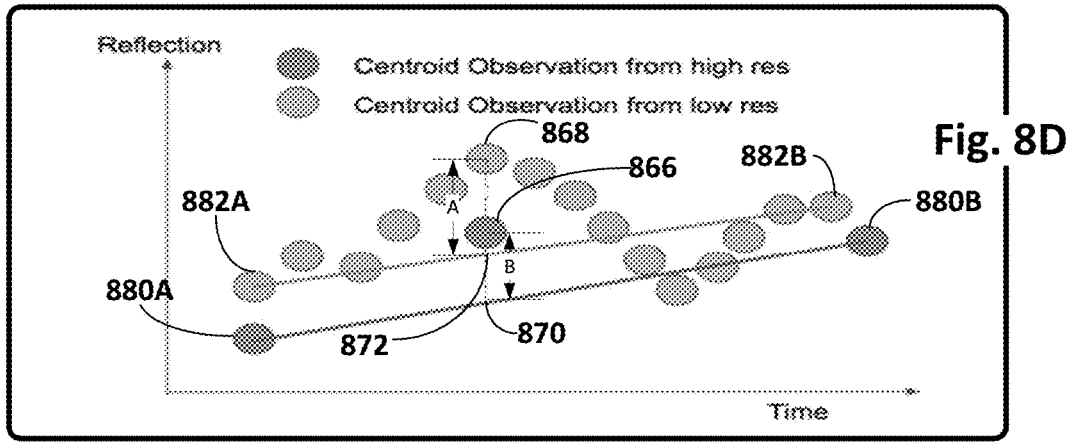

At block 1012, the system may determine a first deviation (e.g., A in FIG. 8D) of ground-truth data forming the low-resolution reference digital image from corresponding data interpolated (872) for the point in time from the first temporal sequence of high-elevation digital images, e.g., as depicted in FIG. 8D. For example, in some implementations, the system may select, as first and second low-resolution anchor digital images, two high-elevation digital images (e.g., 882A, 882B) from the first temporal sequence that were captured in closest temporal proximity to, respectively, high-elevation digital images (e.g., 880A, 880B) from the second temporal sequence that were acquired before, and after, respectively. In some implementations, these high-elevation digital images from the second temporal sequence may also be selected, e.g., as first and second high-resolution anchor digital images (880A, 880B). In some implementations, the corresponding interpolated data (872) calculated from the first temporal sequence of high-elevation images is calculated based on the first and second low-resolution anchor images (882A, 882B).

At block 1014, the system may predict, e.g., based on the first deviation determined at block 1012, a second deviation (e.g., B in FIG. 8D) of data forming the synthetic high-elevation digital image from corresponding data interpolated for the point in time from the second temporal sequence of high-elevation digital images. In some implementations, the corresponding interpolated data calculated for the point in time from the second temporal sequence may be calculated based on the first and second high-resolution anchor digital images (880A, 880B). For example, in some implementations, a plurality of pixel clusters may be identified across the high-elevation digital images of the second temporal sequence. Each pixel cluster of the plurality of pixel clusters may include pixels with comparable spectral-temporal traces across the second temporal sequence of high-elevation digital images. In some implementations, the corresponding data interpolated from the second temporal sequence may include one or more centroids calculated from one or more of the pixel clusters. And as noted previously, in some cases, deltas between each pixel and a centroid of a pixel cluster of which the pixel is a member may be stored and used to determine the pixel's final value in the synthetic high-elevation digital image.

At block 1016, the system may generate the synthetic high-elevation digital image based on the mapping and the predicted second deviation. In various implementations, the generating may include interpolating a spectral sub-band of the pixels of the synthetic high-elevation digital image that exists in the pixels of the second temporal sequence of high-elevation digital images, but is missing from the pixels of the first temporal sequence of high-elevation digital images. In some such implementations, the spectral sub-band missing from the pixels of the first temporal sequence of high-elevation digital images may be near infrared (which may be present in the second temporal sequence). Additionally or alternatively, in some implementations, the generating of block 1016 may be further based on a difference between a first elevation at which one or more digital images of the first temporal sequence was taken and a second elevation at which one or more digital images of the second temporal sequence was taken.

In addition to or instead of the techniques demonstrated by FIGS. 7A-D, 8A-D, 9, and 10, in some implementations, other machine learning techniques may be employed to generate synthetic high-elevation digital images by fusing data from two or more temporal sequences of high-elevation digital images. For example, in some implementations, various deep learning techniques may be employed to facilitate "super-resolution" image processing. For example, in some implementations, deep convolutional neural networks may be trained using ground truth images to generate "enhanced" or "super-resolution" images. Additionally or alternatively, in some implementations, perceptual loss functions may be defined and/or optimized, e.g., based on high-level features extracted from pre-trained networks.

Figure 11:
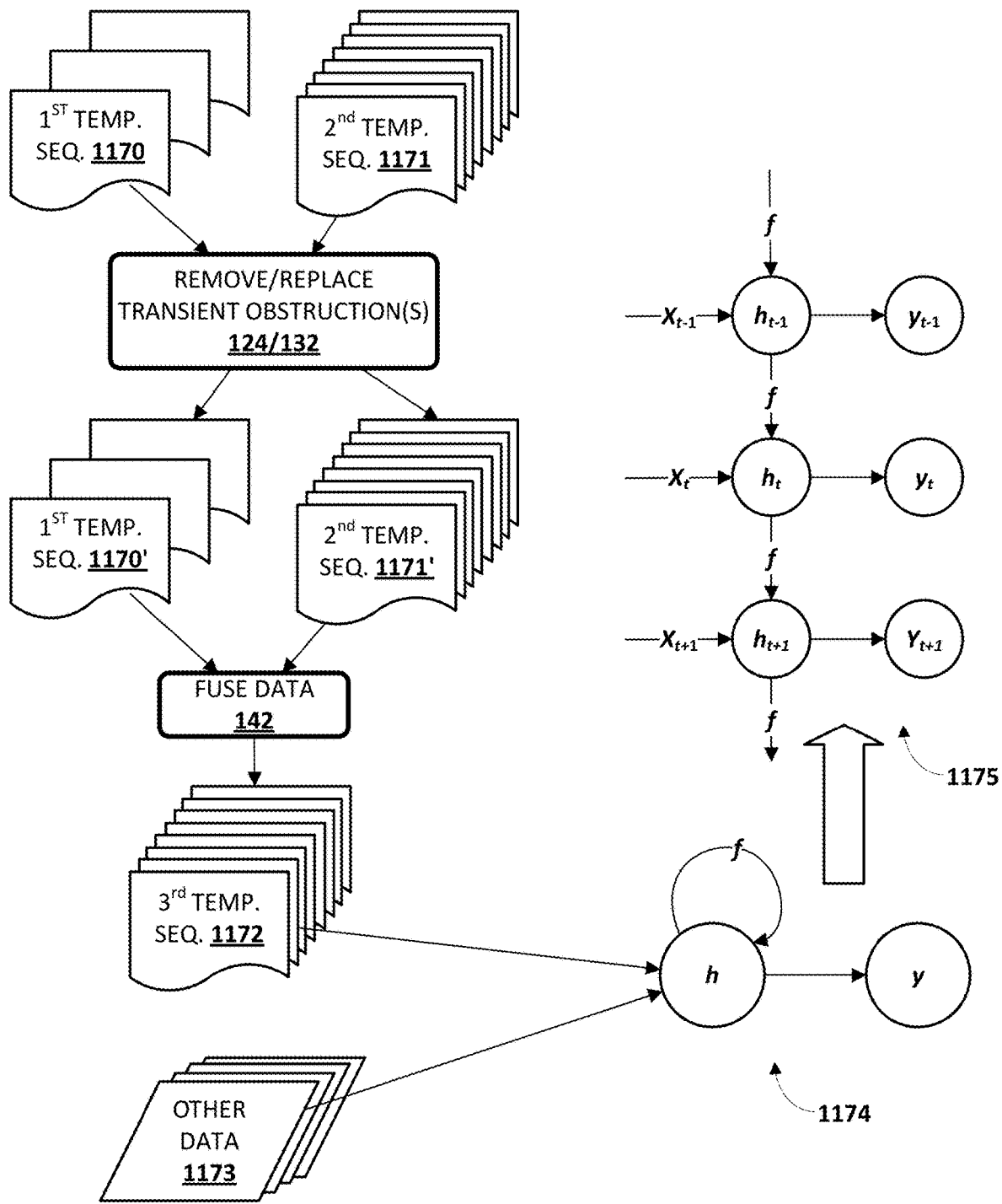
FIG. 11 schematically demonstrates one example of how crop yield prediction may be implemented using a temporal sequence of high-elevation digital images.

As noted previously, techniques described herein for transient obstruction removal and/or generation of synthetic high-elevation digital images may be employed to improve a variety of applications. One application for which these techniques are particularly useful is crop yield prediction. Referring now to FIG. 11, a process is depicted schematically to demonstrate one example of how crop yield prediction may be implementing using a temporal sequence of high-elevation digital images. The high-elevation digital images of the temporal sequence may have sufficiently high spatial resolution and temporal frequency to facilitate accurate crop yield prediction. To this end, in some implementations, one or more high-elevation digital images of the temporal sequence may be transient-obstruction-free, synthetic high-elevation digital images generated using one or of the aforementioned techniques. However, if a ground truth (i.e. non-synthetic) temporal sequence of high-elevation digital images has sufficient spatial resolution and temporal frequency, then the aforementioned techniques may not be required.

In FIG. 11, a first temporal sequence of high-elevation digital images 1170 may capture a geographic area under consideration, such as a field growing a particular type of crop (e.g., spinach, green beans, potatoes, etc.). First temporal sequence of high-elevation digital images 1170 may have relatively high spatial resolutions but may be acquired at a relatively low temporal frequency, such as once every 2-3 days, once a week, once a month, once a quarter, etc. For example, first temporal sequence of high-elevation digital images 1170 may be acquired by the Sentinel-2 satellite described previously.

By contrast, a second temporal sequence of high-elevation digital images 1171 may capture the same geographic area under consideration and may have relatively low spatial resolutions but may be acquired at a relatively high temporal frequency, such as daily. For example, second temporal sequence of high-elevation digital images 1171 may be acquired by the MODIS satellite described previously. Other sources of high-elevation digital images are contemplated herein in addition to or instead of MODIS and Sentinel-2. Moreover, more than two temporal sequences of high-elevation digital images may be provided from a variety of other sources, such as satellites other than MODIS/Sentinel-2, unmanned aerial vehicles, airplanes, balloons, spacecraft, and so forth.

First and second temporal sequences 1170 and 1171 may include at least some images that are wholly or partially obstructed by transient obstructions, such as clouds. Accordingly, in various implementations, first and second temporal sequences 1170 and 1170 may be processed using various cloud-removal techniques known in the art and/or described herein to remove transient obstructions and/or replace them with inferred data. For example, in FIG. 11, first and second temporal sequences 1170 and 1171 are processed by transient obstruction detection engine 124 and/or transient obstruction replacement engine 132 as described previously to generate, respectively, transient-obstruction-free first and second sequences 1170' and 1171'. It should be understood that not all high-elevation images in either sequence will necessarily be obstructed, and in fact there may be many images that are cloud free. Accordingly, transient-obstruction-free first and second temporal sequences 1170' and 1171' may still include original, unaltered (i.e. ground truth) high-elevation digital images.

Transient-obstruction-free first and second temporal sequences 1170' and 1171' may then be processed by data fusion engine 142 as described herein to generate a third temporal sequence of high-elevation digital images 1172. In many cases, third temporal sequence of high-elevation digital images 1172 may include synthetic (and transient-obstruction-free) high-elevation digital images generated based on transient-obstruction-free first and second temporal sequences 1170' and 1171' as described herein. However, in other implementations, if a high spatial resolution temporal sequence of high-elevation digital images is captured at a sufficient frequency, then it may not be necessary to generate synthetic high-elevation digital images. Additionally, in many cases, third temporal sequence of high-elevation digital images 1172 may include, interspersed among the synthetic images, one or more non-synthetic images (or synthetic only inasmuch as transient obstructions have been removed) that include ground truth data captured in the original first temporal sequence of high-elevation digital images 1170.

In various implementations, third temporal sequence of high-elevation digital images 1172 may be applied as input across one or more machine learning models 1174, along with other data 1173, to generate output. In various implementations, the output may be indicative of a predicted crop yield. For example, in FIG. 11, machine learning model 1174 takes the form of a recurrent neural network that generates output y based on iterative application of the inputs x (1172 and 1173) across one or more neural networks. As is typical with recurrent neural networks, recurrent neural network 1174 includes an internal state h that is used at each iteration of applied input x to take into account inputs of previous iterations. This is depicted at an unfolded version 1175 of the recurrent neural network, where time t runs down. Some function $f$ is applied after each iteration to update the state h based on the current iteration's input x. In this example, each iteration of output y may be indicative of an estimated crop yield that is predicted based on the input data x applied up to that point in time.

In some implementations, recurrent neural network 1174 may be trained as follows. A third temporal sequence of high-elevation digital images 1172 that captures a geographic region over a predetermined time interval, such as a crop year, may be obtained as described previously. Preferably the third temporal sequence 1172 includes high-elevation digital images leading right up to harvest, when ground truth crop yield can be determined, although this is not necessarily required.

Other data 1173 may be obtained that includes operational and/or observational data (besides third temporal sequence 1172) for the same geographic area and crop year. In some implementations, other data 1173 may include a plurality of other data points that are grouped into temporal chunks. Each temporal chunk of the plurality of other data points may correspond temporally with a respective high-elevation digital image of third temporal sequence 1172. For example, if a particular high-elevation digital image of third temporal sequence 1172 was captured on or generated to represent June 1, then other data 1173 that corresponds to this digital image may include precipitation on June 1, irrigation applied on June 1, temperature ranges on June 1, sunshine on June 1, soil quality measurements obtained on June 1, data related to plowing or other agricultural operations performed on June 1, and so forth.

These data may be iteratively applied as input x, e.g., day by day, across recurrent neural network 1174 to generate output y for each day. The output y on the last day (e.g., the day(s) of harvest), which may be indicative of an estimated crop yield of the geographic area under consideration, may then be compared to the ground truth crop yield. The different, or "error," between the two may be determined based on the comparing. Recurrent neural network 1174 may then be trained based on the error, e.g., using techniques such as gradient descent, back propagation, etc.

In various implementations, recurrent neural network 1174 may be trained using historical data (e.g., 1172-1173) acquired for multiple (e.g., numerous) geographic areas over multiple time intervals (e.g., crop years). The more geographic areas and/or time intervals for which training data is available, the more accurate recurrent neural network 1174 will become for predicting crop yield. In some implementations, separate recurrent neural networks (or more generally, machine learning models) may be trained for different scenarios, such as different types of crops. For example, one machine learning model may be trained for one crop, another for another crop, and so forth. Additionally or alternatively, in some implementations, a single machine learning model may be trained to predict crop yields for multiple types of crops. In some such embodiments, information about the type of crop, such as genetic information, type, genus, etc., may be applied as input across the model along with the other data (e.g., 1172-1173).

In other implementations, machine learning model 1174 may take other forms. For example, in some implementations, machine learning model 1174 may take the form of long short-term memory ("LSTM") neural networks, gated recurrent unit ("GRU") recurrent networks, and other types of memory networks. Additionally or alternatively, in some implementations, feed-forward neural network 1174 may be a feed-forward neural network without memory elements. In some such implementations, the feed-forward neural network may include a large number of inputs that can accommodate input data x (e.g., 1172-1173) associated with a set number of days. For example, data from every day (or other periodic time unit) may be applied as input at the same time, with one day's data being applied at inputs 1 to n, the next day's data being applied at inputs n+1 to n+n, and so forth.

As yet another example, in some implementations, a feed forward neural network may include enough inputs for a single day's data, plus some additional inputs. Each day's data may be applied across the feed forward neural network to generate output (e.g., y) that takes the form of a latent space embedding. This latent space embedding may be preserved, e.g., in a memory node or elsewhere. At the next iteration/day, the latent space embedding generated during the previous iteration/day may be applied at the additional inputs mentioned previously, along with the next day's data, to generate a further latent space embedding. This may repeat for as many days (or other units of time) for which data is available.

After the machine learning model is trained, new input data may be applied across it in the same way(s) as described above. However, there may be cases when ground truth (1173) data expected at one or more inputs is not available for a particular geographic area under consideration. In some such cases, this missing data may be inferred or otherwise replaced with substitute data in various ways. In some implementations, the missing data may be extrapolated from another geographic area or geographic region as a whole (e.g., other farms in the same state, average data for the state, etc.) In some implementations, the missing data may be extrapolated from another geographic area that is used to grow the same type of crop. In some implementations, the missing data may be inferred using techniques such as expectation-maximization. For example, if only high elevation digital images are available for a geographic area, the other factors that contributed to the observed results in those images may be latent. These latent variables may be inferred by finding a maximum likelihood or maximum a posteriori estimates of the missing data. In yet other implementations, averages of data provided for other similar geographic regions, and/or averages (or other statistical measures) of data may be used. For example, different farmers in a region likely applied different amounts of fertilizer. In some cases, the average amount of fertilizer applied by farmers in the region may be used in place of missing data for a particular farmer's field.

In some implementations, one or more attention mechanisms may be employed with machine learning model 1174 for a variety of reasons. For example, it may be the case that for a given crop year, a particular time period within the crop year has a far greater influence on the ultimate crop yield than other times of the crop year. This may be determined based on various signals, such as input from an agricultural worker (e.g., a farmer indicates the most important week(s) of the crop year). In some such implementations, an attention mechanism may be incorporated into machine learning model 1174 to cause input data associated with the particular time period to be weighted more heavily than input data associated with other time periods within the crop year.

In the examples above, the output (y) of machine learning model 1174 was indicative of predicted crop yield. This output may take various forms. In some implementations, machine learning model 1174 may be a many-to-one model such that, for example, the output comprises a single value that indicates a predicted crop yield for an entire geographic area. However, as noted previously, third temporal sequence 1172 may have a spatial resolution that is relatively granular, such as ten meters by ten meters per pixel, or even more granular. Accordingly, in some implementations, machine learning model 1174 may be designed as a many-to-many machine learning model that provides multiple outputs, each output corresponding to a particular geographic unit underlying each pixel of the third temporal sequence of high-elevation digital images 1172.

Figure 12:
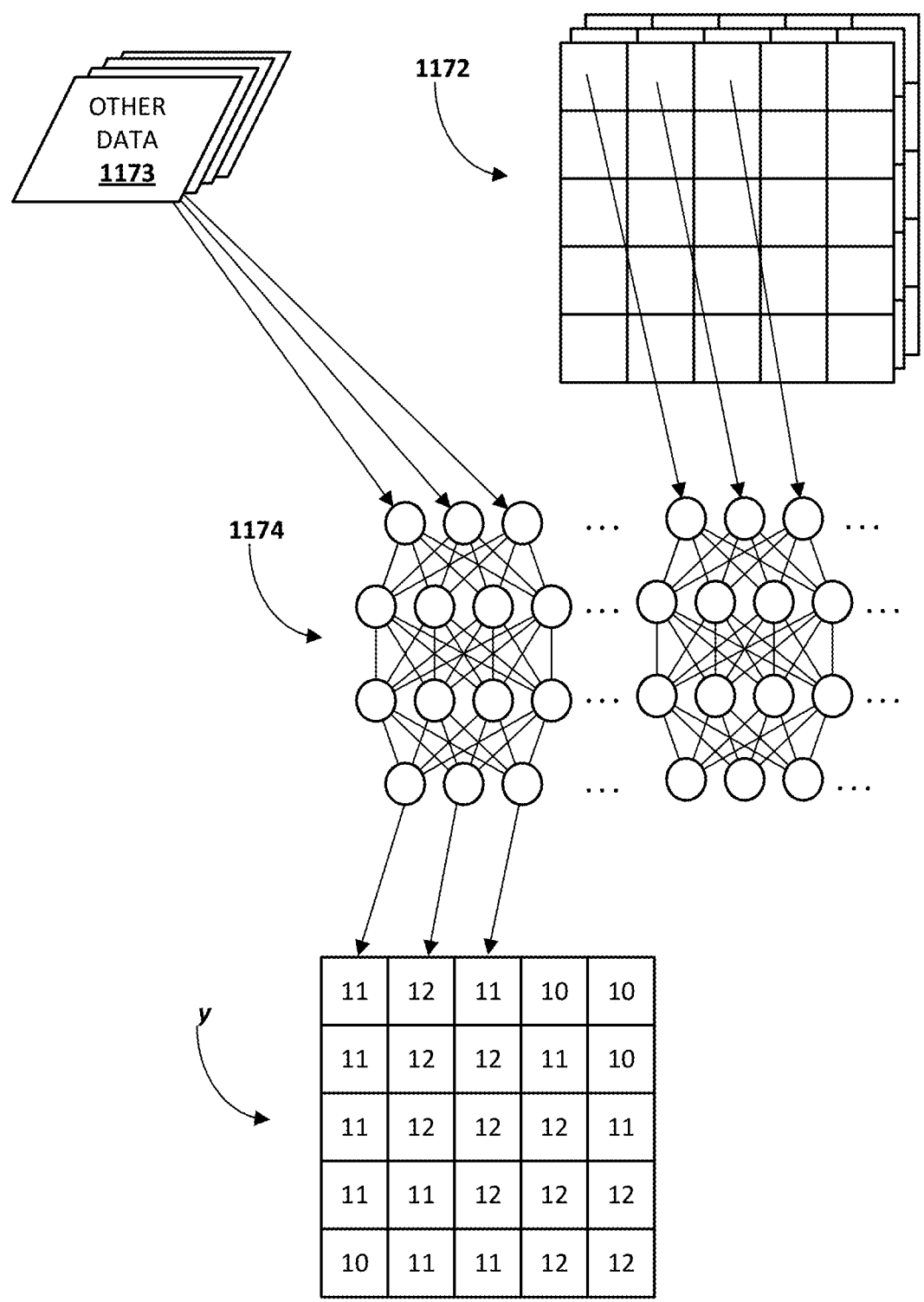
FIG. 12 depicts an example of how a many-to-many machine learning model may be employed to estimate crop yields for individual geographic units, in accordance with various implementations.

This is demonstrated schematically in FIG. 12. In FIG. 12, other data 1173 and third temporal sequence of high-elevation digital images 1172 are depicted being applied as input across machine learning model 1174 to generate output y. However, each high-elevation digital image of third temporal sequence 1172 is depicted in FIG. 12 as a five-by-five matrix of twenty-five pixels. This is not meant to be limiting, and each high-elevation digital image may have any number of pixels greater or less than that depicted in FIG. 12.

Machine learning model 1174 in this example takes the form of some flavor of neural network. Some inputs of machine learning model 1174 receive other data 1173. Other inputs of machine learning model 1174 receive individual pixel values from third temporal sequence of high-elevation digital images 1172. Each output of the output layer (bottom layer in FIG. 12) of machine learning model 1174 yields, as a constituent part of output y, a pixel-level value that can represent, for instance, a predicted crop yield for the geographic unit underlying the corresponding pixels of third temporal sequence 1172. In FIG. 12, values of 10, 11, and 12 are shown in each "pixel" as representing example crop yield predictions for the underlying geographic units. These values are selected for illustrative purposes only and are not meant to be limiting. It can be seen that, for instance, the top right area of the geographic area, which has mostly 10s, is getting less yield than, say, a diagonal strip from top left to bottom right, which has mostly 12s. That may suggest, e.g., to a farmer, that some remedial action should be taken for the top right area of the geographic area. Thus, generating pixel-level, or more particularly, geographic unit-level crop yield predictions may be useful for a variety of purposes, such as identifying underperforming areas of fields, and/or diagnosing factors that contributed to those underperforming areas.

Figure 13:
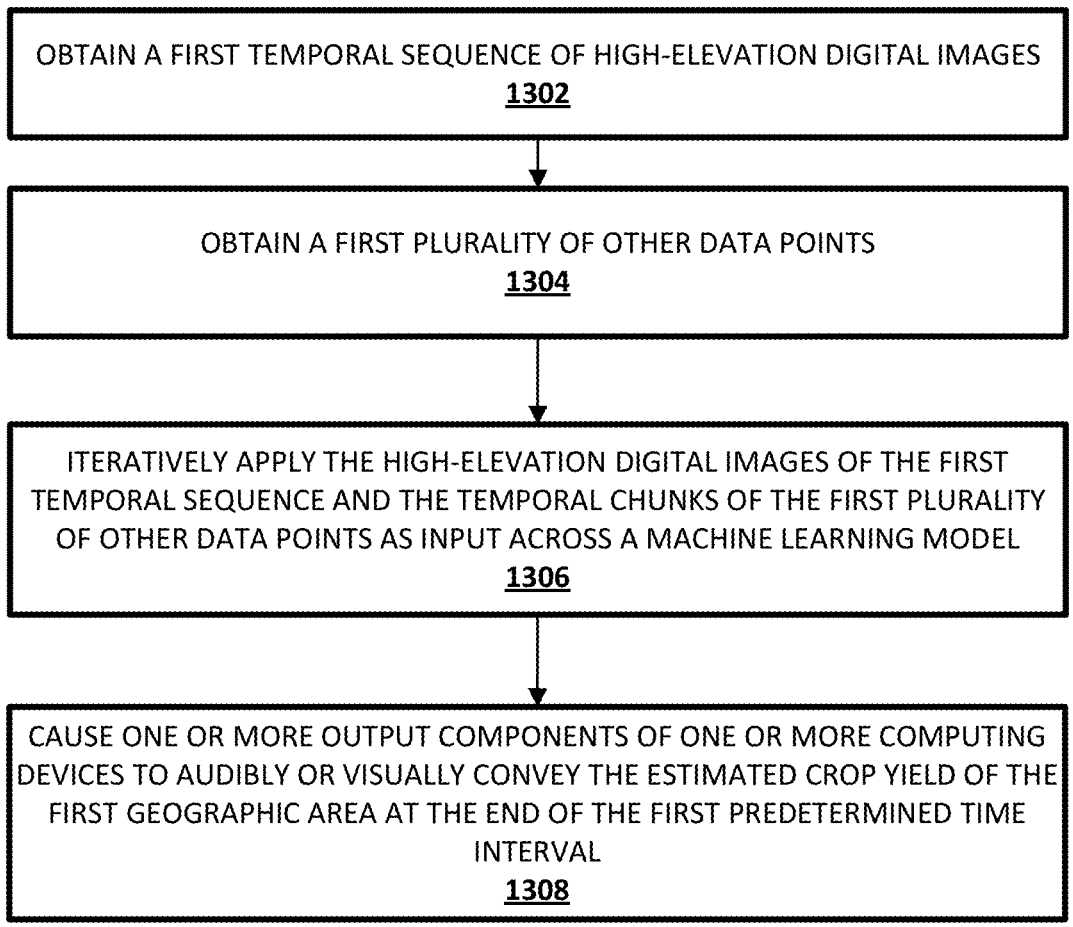
FIG. 13 depicts a flow chart illustrating an example method of practicing selected aspects of the present disclosure, in accordance with various implementations.

Referring now to FIG. 13, an example method 1300 of practicing selected aspects of the present disclosure is described, including inferring predicted crop yields using a trained machine learning model. For convenience, the operations of the flowchart are described with reference to a system that performs the operations. This system may include various components of various computer systems, such as inference module 152 in FIG. 1. Moreover, while operations of method 1300 are shown in a particular order, this is not meant to be limiting. One or more operations may be reordered, omitted or added.

At block 1302, the system may obtain a first temporal sequence of high-elevation digital images. In various implementations, the first temporal sequence of high-elevation digital images may capture a first geographic area, such as one or more fields of interest to a farmer or other agricultural personnel. The first temporal sequence of high-elevation digital images may be acquired over a first predetermined time interval, such as a crop year. During the first predetermined time interval, the first geographic area may include at least a first type of crop (e.g., spinach, potato, romaine lettuce, radishes, turnips, rutabaga, corn, wheat, soy, squash, cilantro, etc.) that was planted with the intent to harvest. As noted above, the first temporal sequence of high-elevation digital images may have spatial resolutions and be acquired at a temporal frequency that satisfy one or more criterion. For example, the spatial resolution may be, for instance, ten meters by ten meters per pixel, and the temporal frequency may be daily, hourly, weekly, etc. Moreover, the first temporal sequence may include only original, ground truth images and/or may include synthetic images in which transient obstructions have been removed and/or that are wholly generated (e.g., inferred) using data fusion techniques described herein.

At block 1304, the system may obtain a first plurality of other data points. In various implementations, the first plurality of other data points may be data points that influence a ground truth crop yield of the first geographic area after the first predetermined time interval. These may include observational and/or operational data as described herein. In various implementations, the first plurality of other data points may be grouped into temporal chunks, with each temporal chunk of the first plurality of other data points corresponding temporally with a respective high-elevation digital image of the first temporal sequence of high-elevation digital images. For example, if there are daily high-elevation digital images available, then other daily may be provided in daily chunks.

At block 1306, the system may iteratively apply the high-elevation digital images of the first temporal sequence and the temporal chunks of the first plurality of other data points as input across a machine learning model. The machine learning model may take various forms, such as a recurrent neural network, an LSTM neural network, a GRU neural network, and so forth. In other embodiments, the machine learning model may not be a memory-based network, in which case the input data may not necessarily be applied iteratively, but could for instance be applied all at once. The result of the iterative application may be to generate first output indicative of an estimated crop yield of the first geographic area at the end of the first predetermined time interval.

At block 1308, the system may cause one or more output components of one or more computing devices to audibly or visually convey the estimated crop yield of the first geographic area at the end of the first predetermined time interval. For example, a report may be generated for the farmer or other personnel that are stewards of the one or more fields in the first geographic area. As noted above, the output may come in various forms. In implementations in which a many-to-one machine learning model is employed, the output may be a single value indicative of the estimated crop yield over a geographic area. Additionally or alternatively, in some implementations in which a many-to-many machine learning model is employed, the output may be at the pixel level and may include values corresponding to geographic units underlying individual pixels of the first temporal sequence.

Figure 14:
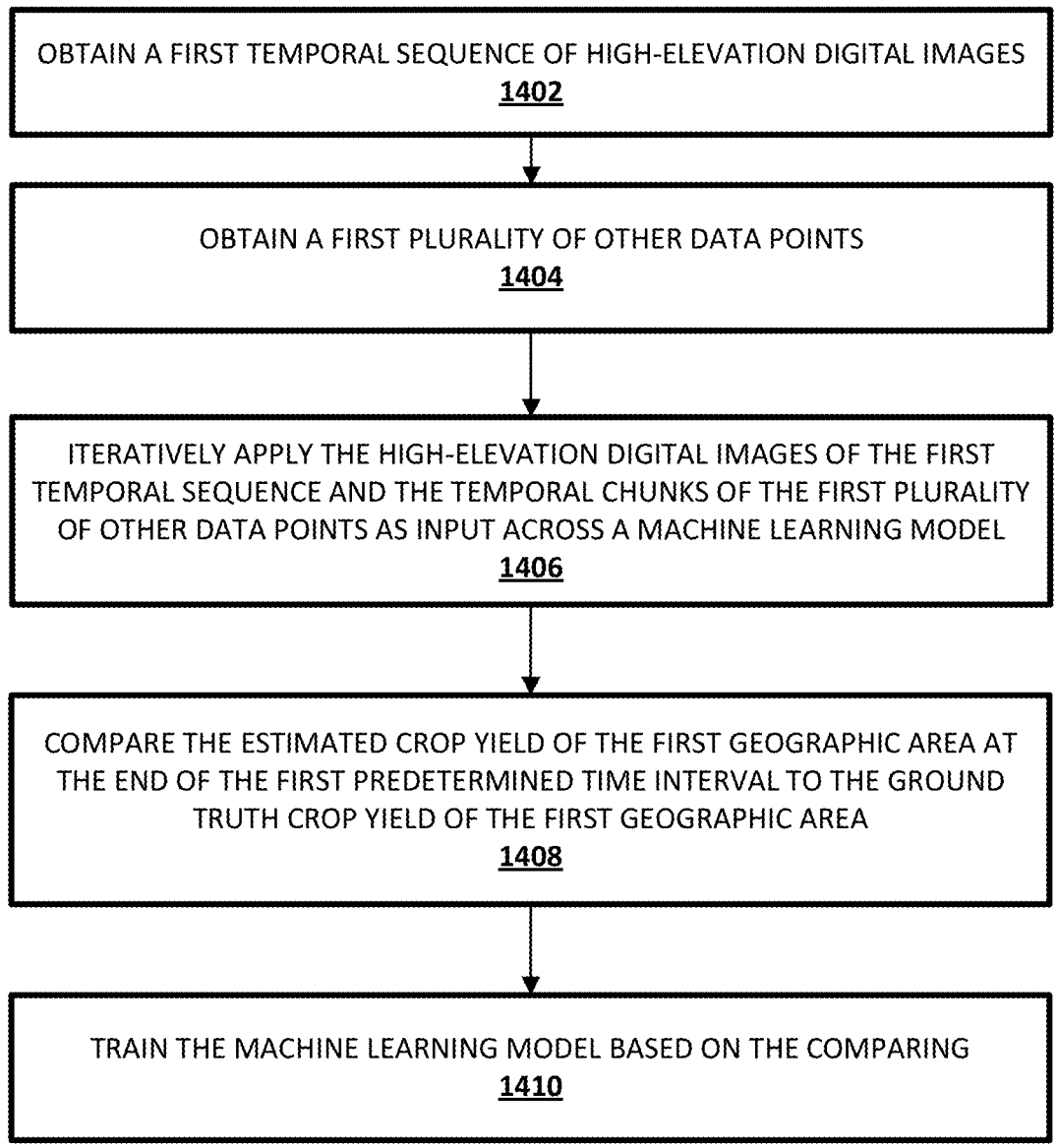
FIG. 14 depicts a flow chart illustrating an example method of practicing selected aspects of the present disclosure, in accordance with various implementations.

Referring now to FIG. 14, an example method 1400 of practicing selected aspects of the present disclosure is described, including training the machine learning model. For convenience, the operations of the flowchart are described with reference to a system that performs the operations. This system may include various components of various computer systems, such as training module 150 in FIG. 1. Moreover, while operations of method 1400 are shown in a particular order, this is not meant to be limiting. One or more operations may be reordered, omitted or added.

At block 1402, the system may obtain a first temporal sequence of high-elevation digital images, similar to block 1302. In various implementations, the first temporal sequence of high-elevation digital images may capture a first geographic area and are acquired over a first predetermined time interval. During the first predetermined time interval, the first geographic area may include a first type of crop, again, similar to block 1302.

At block 1404, the system may obtain a first plurality of other data points, similar to block 1304. In various implementations, the first plurality of other data points may influence a ground truth crop yield of the first geographic area at the end of the first predetermined time interval. Similar to block 1304, the first plurality of other data points may be grouped into temporal chunks, each temporal chunk of the first plurality of other data points corresponding temporally with a respective high-elevation digital image of the first temporal sequence of high-elevation digital images.

At block 1406, the system may iteratively apply the high-elevation digital images of the first temporal sequence and the temporal chunks of the first plurality of other data points as input across the machine learning model to generate first output indicative of an estimated crop yield of first geographic area at the end of the first predetermined time interval. This may be similar to block 1306.

At block 1408, the system may compare the estimated crop yield of the first geographic area at the end of the first predetermined time interval to the ground truth crop yield of the first geographic area. At block 1410, the system may train the machine learning model based on the comparing, e.g., using techniques such as back propagation, gradient descent, etc.

Figure 15:
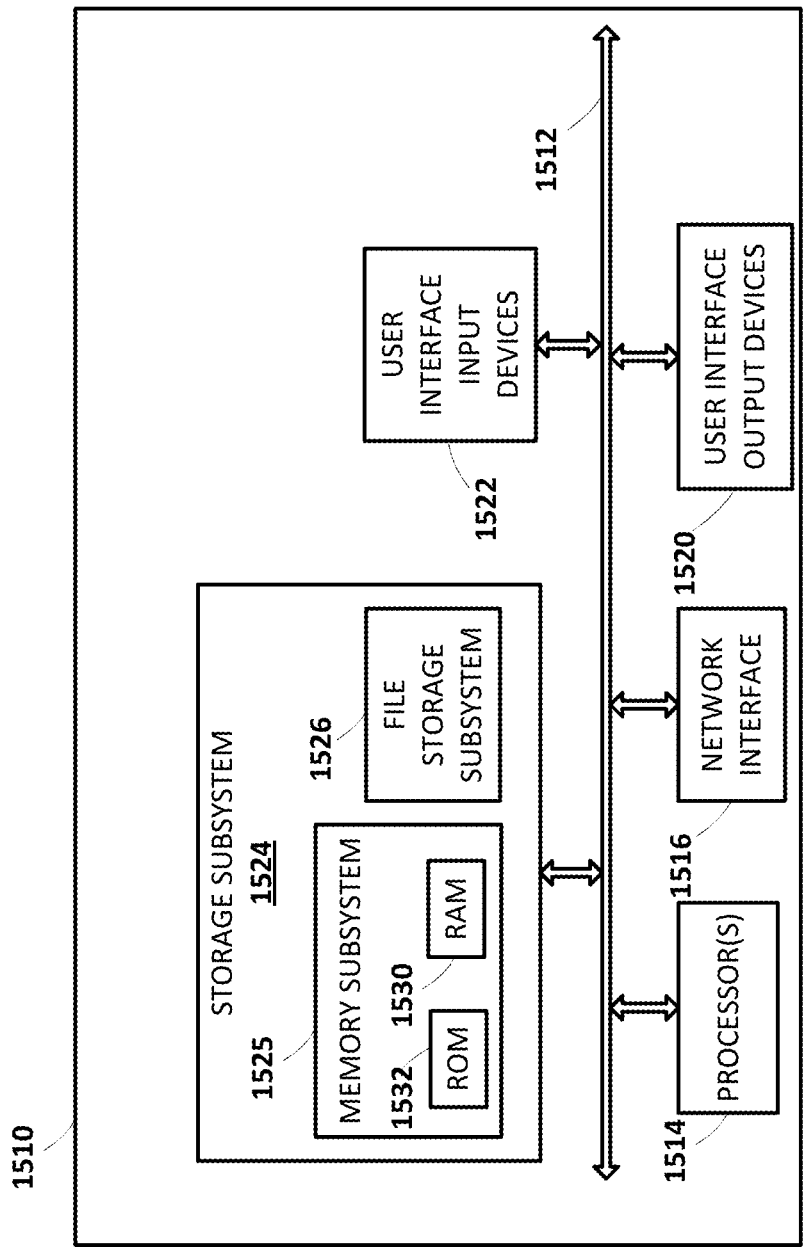
FIG. 15 schematically depicts an example architecture of a computer system.

FIG. 15 is a block diagram of an example computer system 1510. Computer system 1510 typically includes at least one processor 1514 which communicates with a number of peripheral devices via bus subsystem 1512. These peripheral devices may include a storage subsystem 1524, including, for example, a memory subsystem 1525 and a file storage subsystem 1526, user interface output devices 1520, user interface input devices 1522, and a network interface subsystem 1516. The input and output devices allow user interaction with computer system 1510. Network interface subsystem 1516 provides an interface to outside networks and is coupled to corresponding interface devices in other computer systems.

User interface input devices 1522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 1510 or onto a communication network.

User interface output devices 1520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 1510 to the user or to another machine or computer system.

Storage subsystem 1524 stores programming and data constructs that provide the functionality of some or all of the modules described herein. For example, the storage subsystem 1524 may include the logic to perform selected aspects of the methods described herein, and/or to implement one or more components depicted in prior figures.

These software modules are generally executed by processor 1514 alone or in combination with other processors. Memory 1525 used in the storage subsystem 1524 can include a number of memories including a main random access memory (RAM) 1530 for storage of instructions and data during program execution and a read only memory (ROM) 1532 in which fixed instructions are stored. A file storage subsystem 1526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1526 in the storage subsystem 1524, or in other machines accessible by the processor(s) 1514.

Bus subsystem 1512 provides a mechanism for letting the various components and subsystems of computer system 1510 communicate with each other as intended. Although bus subsystem 1512 is shown schematically as a single bus, alternative implementations of the bus subsystem may use multiple busses.

Computer system 1510 can be of varying types including a workstation, server, computing cluster, blade server, server farm, or any other data processing system or computing device. Due to the ever-changing nature of computers and networks, the description of computer system 1510 depicted in FIG. 15 is intended only as a specific example for purposes of illustrating some implementations. Many other configurations of computer system 1510 are possible having more or fewer components than the computer system depicted in FIG. 15.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented using one or more processors, comprising:
  obtaining a first temporal sequence of high-elevation digital images,
    wherein the first temporal sequence of high-elevation digital images capture a first geographic area at a first temporal frequency, and
    wherein each high-elevation digital image of the first temporal sequence is captured at a first spatial resolution;
  obtaining a second temporal sequence of high-elevation digital images,
    wherein the second temporal sequence of high-elevation digital images capture the first geographic area at a second temporal frequency that is less than the first temporal frequency, and
    wherein each high-elevation digital image of the second temporal sequence is captured at a second spatial resolution that is greater than the first spatial resolution;
  selecting a given high-elevation digital image from the first temporal sequence that is captured during a time interval in which no high-elevation digital images of the second temporal sequence are available; and
  fusing the given high-elevation digital image of the first temporal sequence with data ascertained from one or more high-elevation digital images of the second temporal sequence to generate a synthetic high-elevation digital image of the first geographic area at the second spatial resolution;
  including the synthetic high-elevation digital image of the first geographic area as part of a third temporal sequence of high-elevation digital images that capture the first geographic area over a predetermined time interval, wherein the first geographic area includes a first type of crop during the predetermine time interval;

iteratively applying the high-elevation digital images of the third temporal sequence as input across a machine learning model to generate a first output indicative of an estimated crop yield of the first geographic area at the end of the predetermined time interval; and causing one or more output components of one or more computing devices to audibly or visually convey the estimated crop yield of the first geographic area at the end of the predetermined time interval.

2. The method of claim 1, further comprising:

obtaining a first plurality of other data points, wherein the first plurality of other data points influence a ground truth crop yield of the first geographic area after the first predetermined time interval, and wherein the first plurality of other data points are grouped into temporal chunks, each temporal chunk of the first plurality of other data points corresponding temporally with a respective high-elevation digital image of the third temporal sequence of high-elevation digital images;

wherein the temporal chunks of the first plurality of other data points are applied as input across the machine learning model to generate the first output.

3. The method of claim 2, wherein the first plurality of other data points includes one or more data points that are extrapolated from a geographic region that includes the first geographic area.

4. The method of claim 2, wherein the first plurality of other data points includes one or more data points that are extrapolated from another geographic area that is used to grow the first type of crop.

5. The method of claim 2, wherein the first plurality of other data points includes one or more data points that are inferred using expectation maximization.

6. The method of claim 2, wherein the first plurality of other data points includes fertilizer applied to at least a portion of the first geographic area.

7. The method of claim 2, wherein the first plurality of other data points includes pesticide applied to at least a portion of the first geographic area.

8. The method of claim 1, wherein the fusing comprises, based on a first deviation of ground truth data forming the given high-elevation digital image of the first temporal sequence from data interpolated from the first temporal sequence of high-elevation digital images, predicting a second deviation from data interpolated from the second temporal sequence of high-elevation digital images.

9. The method of claim 8, wherein the fusing further comprises, based on the given high-elevation digital image of the first temporal sequence selected from the first temporal sequence, and based on the second deviation, generating the synthetic high-elevation digital image of the geographic area at the second spectral resolution.

10. A system comprising one or more processors and memory storing instructions that, in response to execution by the one or more processors, cause the one or more processors to:

obtain a first temporal sequence of high-elevation digital images,
wherein the first temporal sequence of high-elevation digital images capture a first geographic area at a first temporal frequency, and
wherein each high-elevation digital image of the first temporal sequence is captured at a first spatial resolution;

obtain a second temporal sequence of high-elevation digital images,
wherein the second temporal sequence of high-elevation digital images capture the first geographic area at a second temporal frequency that is less than the first temporal frequency, and
wherein each high-elevation digital image of the second temporal sequence is captured at a second spatial resolution that is greater than the first spatial resolution;

select a given high-elevation digital image from the first temporal sequence that is captured during a time interval in which no high-elevation digital images of the second temporal sequence are available; and fuse the given high-elevation digital image of the first temporal sequence with data ascertained from one or more high-elevation digital images of the second temporal sequence to generate a synthetic high-elevation digital image of the first geographic area at the second spatial resolution;

include the synthetic high-elevation digital image of the first geographic area as part of a third temporal sequence of high-elevation digital images that capture the first geographic area over a predetermined time interval, wherein the first geographic area includes a first type of crop during the predetermine time interval;

iteratively apply the high-elevation digital images of the third temporal sequence as input across a machine learning model to generate a first output indicative of an estimated crop yield of the first geographic area at the end of the predetermined time interval; and cause one or more output components of one or more computing devices to audibly or visually convey the estimated crop yield of the first geographic area at the end of the predetermined time interval.

11. The system of claim 10, further comprising instructions to:

obtain a first plurality of other data points, wherein the first plurality of other data points influence a ground truth crop yield of the first geographic area after the first predetermined time interval, and wherein the first plurality of other data points are grouped into temporal chunks, each temporal chunk of the first plurality of other data points corresponding temporally with a respective high-elevation digital image of the third temporal sequence of high-elevation digital images;

wherein the temporal chunks of the first plurality of other data points are applied as input across the machine learning model to generate the first output.

12. The system of claim 11, wherein the first plurality of other data points includes one or more data points that are extrapolated from a geographic region that includes the first geographic area.

13. The system of claim 11, wherein the first plurality of other data points includes one or more data points that are extrapolated from another geographic area that is used to grow the first type of crop.

14. The system of claim 11, wherein the first plurality of other data points includes one or more data points that are inferred using expectation maximization.

15. The system of claim 11, wherein the first plurality of other data points includes fertilizer applied to at least a portion of the first geographic area.

16. The system of claim 11, wherein the first plurality of other data points includes pesticide applied to at least a portion of the first geographic area.

17. The system of claim 10, wherein the instructions to fuse include instructions to, based on a first deviation of ground truth data forming the given high-elevation digital image of the first temporal sequence from data interpolated from the first temporal sequence of high-elevation digital images, predict a second deviation from data interpolated from the second temporal sequence of high-elevation digital images.

18. The system of claim 17, wherein the synthetic high-elevation digital image of the geographic area at the second spectral resolution is generated based on the given high-elevation digital image of the first temporal sequence selected from the first temporal sequence, and based on the second deviation.

19. At least one non-transitory computer-readable medium comprising instructions that, when executed by one or more processors, cause the one or more processors to:
obtain a first temporal sequence of high-elevation digital images,
wherein the first temporal sequence of high-elevation digital images capture a first geographic area at a first temporal frequency, and
wherein each high-elevation digital image of the first temporal sequence is captured at a first spatial resolution;
obtain a second temporal sequence of high-elevation digital images,
wherein the second temporal sequence of high-elevation digital images capture the first geographic area at a second temporal frequency that is less than the first temporal frequency, and
wherein each high-elevation digital image of the second temporal sequence is captured at a second spatial resolution that is greater than the first spatial resolution;
select a given high-elevation digital image from the first temporal sequence that is captured during a time interval in which no high-elevation digital images of the second temporal sequence are available; and
fuse the given high-elevation digital image of the first temporal sequence with data ascertained from one or more high-elevation digital images of the second temporal sequence to generate a synthetic high-elevation digital image of the first geographic area at the second spatial resolution;
include the synthetic high-elevation digital image of the first geographic area as part of a third temporal sequence of high-elevation digital images that capture the first geographic area over a predetermined time interval, wherein the first geographic area includes a first type of crop during the predetermine time interval;
iteratively apply the high-elevation digital images of the third temporal sequence as input across a machine learning model to generate a first output indicative of an estimated crop yield of the first geographic area at the end of the predetermined time interval; and
cause one or more output components of one or more computing devices to audibly or visually convey the estimated crop yield of the first geographic area at the end of the predetermined time interval.

20. The at least one non-transitory computer-readable medium of claim 19, further comprising instructions to:
obtain a first plurality of other data points, wherein the first plurality of other data points influence a ground truth crop yield of the first geographic area after the first predetermined time interval, and wherein the first plurality of other data points are grouped into temporal chunks, each temporal chunk of the first plurality of other data points corresponding temporally with a respective high-elevation digital image of the third temporal sequence of high-elevation digital images;
wherein the temporal chunks of the first plurality of other data points are applied as input across the machine learning model to generate the first output.

* * * * *